US010719328B2

(12) United States Patent
Gschwind et al.

(10) Patent No.: US 10,719,328 B2
(45) Date of Patent: *Jul. 21, 2020

(54) DETERMINING AND PREDICTING DERIVED VALUES USED IN REGISTER-INDIRECT BRANCHING

(71) Applicant: INTERNATIONAL BUSINESS MACHINES CORPORATION, Armonk, NY (US)

(72) Inventors: Michael K. Gschwind, Chappaqua, NY (US); Valentina Salapura, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/680,855

(22) Filed: Aug. 18, 2017

(65) Prior Publication Data

US 2019/0056946 A1    Feb. 21, 2019

(51) Int. Cl.
*G06F 9/38* (2018.01)
*G06F 9/30* (2018.01)
*G06F 9/32* (2018.01)

(52) U.S. Cl.
CPC ........ *G06F 9/3806* (2013.01); *G06F 9/30058* (2013.01); *G06F 9/30098* (2013.01); *G06F 9/32* (2013.01)

(58) Field of Classification Search
CPC .................................................. G06F 9/3806
See application file for complete search history.

(56) References Cited

U.S. PATENT DOCUMENTS

| 5,241,679 | A | 8/1993 | Nakagawa et al. |
| 5,459,682 | A | 10/1995 | Sato |
| 5,604,877 | A | 2/1997 | Hoyt et al. |
| 5,737,590 | A | 4/1998 | Hara |
| 5,740,414 | A | 4/1998 | Tovey et al. |

(Continued)

FOREIGN PATENT DOCUMENTS

| CN | 102306093 A | 1/2012 |
| CN | 102934075 A | 2/2013 |

(Continued)

OTHER PUBLICATIONS

Gschwind, Michael K. et al., "Detecting That a Sequence of Instructions Creates an Affiliated Relationship," U.S. Appl. No. 15/816,363, filed Nov. 17, 2017, pp. 1-93.

(Continued)

*Primary Examiner* — Michael J Metzger
(74) *Attorney, Agent, or Firm* — Steven Chiu; Matthew M. Hulihan; Heslin Rothenberg Farley & Mesiti PC

(57) ABSTRACT

A predicted value to be used in register-indirect branching is predicted. The predicted value is to be stored in one or more locations based on the prediction. An offset for a predicted derived value is obtained. The predicted derived value is to be used as a pointer to a reference data structure providing access to variables used in processing. The predicted derived value is generated using the predicted value and the offset. The predicted derived value is used to access the reference data structure during processing.

8 Claims, 32 Drawing Sheets

(56) References Cited

U.S. PATENT DOCUMENTS

| | | | |
|---|---|---|---|
| 5,774,722 A | 6/1998 | Gheith | |
| 5,822,787 A * | 10/1998 | Zucker | G06F 9/44521 711/213 |
| 5,850,543 A | 12/1998 | Shiell et al. | |
| 5,892,936 A | 4/1999 | Tran et al. | |
| 5,896,528 A | 4/1999 | Katsuno et al. | |
| 5,898,864 A | 4/1999 | Golla et al. | |
| 5,898,885 A | 4/1999 | Dickol et al. | |
| 6,308,322 B1 | 10/2001 | Serocki et al. | |
| 6,324,643 B1 | 11/2001 | Krishnan et al. | |
| 6,332,191 B1 | 12/2001 | Witt | |
| 6,442,707 B1 | 8/2002 | McGrath et al. | |
| 6,446,034 B1 | 9/2002 | Egolf | |
| 6,609,194 B1 * | 8/2003 | Henry | G06F 9/322 711/213 |
| 6,625,660 B1 | 9/2003 | Guthrie et al. | |
| 6,691,220 B1 | 2/2004 | Guthrie et al. | |
| 6,715,064 B1 | 3/2004 | D'Sa et al. | |
| 6,766,442 B1 | 7/2004 | Kahle et al. | |
| 6,772,323 B2 | 8/2004 | Krishnan et al. | |
| 6,826,747 B1 | 11/2004 | Augsburg et al. | |
| 6,845,442 B1 | 1/2005 | Lepak et al. | |
| 6,880,073 B2 | 4/2005 | Arimilli et al. | |
| 6,965,983 B2 | 11/2005 | Lin | |
| 7,024,537 B2 | 4/2006 | Pickett et al. | |
| 7,028,166 B2 | 4/2006 | Pickett | |
| 7,089,400 B1 | 8/2006 | Pickett | |
| 7,263,600 B2 | 8/2007 | Sander et al. | |
| 7,310,799 B2 | 12/2007 | Eisenberg et al. | |
| 7,539,851 B2 | 5/2009 | Gove | |
| 7,737,725 B1 | 6/2010 | Ansari et al. | |
| 7,788,473 B1 | 8/2010 | Nelson et al. | |
| 7,809,933 B2 | 10/2010 | Levitan et al. | |
| 8,607,211 B2 | 12/2013 | Blainey et al. | |
| 8,639,913 B2 | 1/2014 | Codrescu | |
| 8,769,539 B2 | 7/2014 | Hopper et al. | |
| 8,843,729 B2 | 9/2014 | Parks | |
| 8,930,657 B2 | 1/2015 | Balasubramanian | |
| 9,075,636 B2 | 7/2015 | Gschwind | |
| 9,110,675 B1 | 8/2015 | Gschwind et al. | |
| 9,189,234 B2 | 11/2015 | Inoue | |
| 9,244,854 B2 | 1/2016 | Gschwind | |
| 9,250,875 B1 | 2/2016 | Gschwind et al. | |
| 9,298,467 B2 | 3/2016 | Jackson | |
| 9,311,093 B2 | 4/2016 | Gschwind et al. | |
| 9,329,850 B2 | 5/2016 | Gschwind et al. | |
| 9,330,017 B2 | 5/2016 | Deutschle et al. | |
| 9,348,616 B2 | 5/2016 | Gschwind et al. | |
| 9,367,319 B2 | 6/2016 | Wang et al. | |
| 9,384,130 B2 | 7/2016 | Gschwind et al. | |
| 9,513,828 B2 | 12/2016 | Bertolli et al. | |
| 9,639,913 B2 | 5/2017 | Satoh | |
| 2004/0172524 A1 | 9/2004 | Hoogerbrugge | |
| 2004/0173524 A1 | 9/2004 | Hoogerbrugge | |
| 2004/0225866 A1 | 11/2004 | Williamson | |
| 2004/0236928 A1 | 11/2004 | Haugh | |
| 2005/0262329 A1 | 11/2005 | Krishnan et al. | |
| 2006/0010310 A1 | 1/2006 | Bean et al. | |
| 2006/0095901 A1 | 5/2006 | Brokenshire et al. | |
| 2006/0242393 A1 * | 10/2006 | Park, II | G06F 9/30061 712/240 |
| 2006/0253686 A1 | 11/2006 | Suzuki | |
| 2007/0088937 A1 | 4/2007 | Archambault et al. | |
| 2008/0016316 A1 | 1/2008 | Codrescu et al. | |
| 2008/0256347 A1 | 10/2008 | Eickemeyer et al. | |
| 2009/0113179 A1 | 4/2009 | Kakeda et al. | |
| 2011/0078425 A1 | 3/2011 | Shah et al. | |
| 2011/0145834 A1 | 6/2011 | Damron | |
| 2011/0167247 A1 | 7/2011 | Gibbs et al. | |
| 2011/0320787 A1 | 11/2011 | Dieffenderfer et al. | |
| 2012/0079255 A1 | 3/2012 | Combs et al. | |
| 2012/0204007 A1 | 8/2012 | Reid | |
| 2013/0042093 A1 | 2/2013 | Van Dyke et al. | |
| 2013/0205403 A1 | 8/2013 | Grocutt et al. | |
| 2013/0263153 A1 | 10/2013 | Gschwind | |
| 2013/0275734 A1 | 10/2013 | Toll et al. | |
| 2013/0311754 A1 | 11/2013 | Brown et al. | |
| 2013/0346727 A1 | 12/2013 | Reddy | |
| 2014/0006752 A1 | 1/2014 | Morrow et al. | |
| 2014/0149722 A1 | 5/2014 | Brown et al. | |
| 2014/0201509 A1 | 7/2014 | Jackson | |
| 2014/0208073 A1 | 7/2014 | Blasco-Allue et al. | |
| 2014/0281438 A1 | 9/2014 | Abdallah | |
| 2014/0281441 A1 | 9/2014 | Manoukian | |
| 2015/0046691 A1 | 2/2015 | Heil et al. | |
| 2015/0227462 A1 | 8/2015 | Grocutt | |
| 2015/0347148 A1 | 12/2015 | Gschwind | |
| 2016/0055003 A1 | 2/2016 | Clancy et al. | |
| 2016/0117155 A1 | 4/2016 | Salmon_Legagneur et al. | |
| 2016/0180079 A1 | 6/2016 | Sahita et al. | |
| 2016/0202980 A1 | 7/2016 | Henry et al. | |
| 2016/0263153 A1 | 9/2016 | O'Hara | |
| 2017/0177343 A1 | 6/2017 | Lai et al. | |
| 2018/0267798 A1 | 9/2018 | Grisenthwaite et al. | |

FOREIGN PATENT DOCUMENTS

| | | |
|---|---|---|
| CN | 104978284 A | 10/2015 |
| GB | 2510966 B | 3/2015 |
| WO | WO201524452 A1 | 2/2015 |

OTHER PUBLICATIONS

Gschwind, Michael K. et al., "Concurrent Prediction of Branch Addresses and Update of Register Contents," U.S. Appl. No. 15/816,401, filed Nov. 17, 2017, pp. 1-93.

Gschwind, Michael K. et al., "Dynamic Fusion of Derived Value Creation and Prediction of Derived Values in a Subroutine Branch Sequence," U.S. Appl. No. 15/819,503, filed Nov. 21, 2017, pp. 1-93.

Gschwind, Michael K. et al., "Predicting and Storing a Predicted Target Address in a Plurality of Selected Locations," U.S. Appl. No. 15/819,542, filed Nov. 21, 2017, pp. 1-93.

Gschwind, Michael K. et al., "Determining and Predicting Affiliated Registers Based on Dynamic Runtime Control Flow Analysis," U.S. Appl. No. 15/819,524, filed Nov. 21, 2017, pp. 1-93.

Gschwind, Michael K. et al., "Determining and Predicting Derived Values," U.S. Appl. No. 15/819,450, filed Nov. 21, 2017, pp. 1-93.

Gschwind, Michael K. et al., "Predicting of an Affiliated Register," U.S. Appl. No. 15/822,866, filed Nov. 27, 2017, pp. 1-93.

List of IBM Patents and/or Patent Applications Treated as Related, dated Jan. 16, 2018, pp. 1-2.

IBM, "z/Architecture—Principles of Operation," IBM Publication No. SA22-7832-10, Eleventh Edition, Mar. 2015, pp. 1-1732.

IBM, "Power ISA—V2.07B," Apr. 2015, pp. 1-1527.

Mel, Peter and Tim Grance, "The NIST Definition of Cloud Computing," National Institute of Standards and Technology, Information Technology Laboratory, Special Publication 800-145, Sep. 2011, pp. 1-7.

"64-Bit ELF V2 ABI Specification: Power Architecture," https://openpowerfoundation.org/?resource_lib=64-bit-elf-v2-abi-specification-power-architecture, downloaded from Internet Aug. 7, 2017, p. 1.

Kaiser, Scott et al., "A Method for Predicting Support Escalations with Machine Learning," IP.com No. IPCOM000236818D, May 16, 2014, pp. 1-8 (+ cover).

Poblocki, Andrzej, "Predicting the Length of Translated Text Using Statistics," IP.com No. IPCOM000230931D, Sep. 18, 2013, pp. 1-3 (+ cover).

Anonymous, "Storing Profiling Information for Use in Future Virtual Machine Invokations for Optimization Decisions," IP.com No. IPCOM000216308D, Mar. 29, 2012, pp. 1-5 (+ cover).

Hu, Shiliang et al., "Using Dynamic Binary Translation to Fuse Dependent Instructions," Proceedings of the International Symposium on Code Generation and Optimization, Sep. 2004, pp. 1-12.

Waterman, Andrew, "Design of the RISC-V Instruction Set Architecture," Electrical Engineering and Computer Sciences—University of California at Berkeley, Technical Report No. UCB/EECS-2016-1, Jan. 2016, pp. 1-117.

(56) References Cited

OTHER PUBLICATIONS

IBM, "Configurable Microprocessor Branch Prediction for Performance and Power Savings," IP.com No. IPCOM000028112D, Apr. 2004, pp. 1-4 (+ cover).
Das, Moumita et al., "Attacks on Branch Predictors: Am Empirical Exploration," ICISS 2015, Dec. 2015, pp. 511-520.
Boogerd, Cathal et al., "On the Use of Data Flow Analysis in Static Profiling," Eighth IEEE International Working Conference on Source Code Analysis and Manipulation, Jul. 2008, pp. 79-88.
Pophale, Swaroop et al., "Evaluating OpenMP Affinity on the POWER8 Architecture," IWOMP 2016, Oct. 2016, pp. 35-46.
Sinharoy, B. et al., "IBM POWER8 Processor Core Microarchitecture," IBM Journal of Research and Development, vol. 59, No. 1, Paper 3, Jan./Feb. 2015, pp. 2:1-2:21.
Abalenkovs, M. et al., "Parallel Programming Models for Dense Linear Algebra on Heterogeneous Systems," Supercomputing Frontiers and Innovations, 2015, vol. 2, No. 4, Mar. 2015, pp. 67-86.
Anonymous, "Method and System for Improved Branch Predictions," IP.com No. IPCOM000214467D, Jan. 2012, pp. 1-2 (+ cover).
Anonymous, "Address Mode Aware Branch Prediction with Shutdown Capability," IP.com No. IPCOM000235852D, Mar. 2014, pp. 1-5.
Anonymous, "A Unified Scalar and SIMD Instruction Set Architecture: Repurposing a Scalar Instruction Set for SIMD Instruction via Mode-Sensitive Semantics," IP.com No. IPCOM000241485D, May 5, 2015, pp. 1-3 (+ cover).
IBM, "A Technique for Adding Additional Registers to an Instruction Set Architecture," IP.com No. IPCOM000188078D, Sep. 2009, pp. 1-5 (+ cover).
Gschwind, Michael K. et al., "Detecting That a Sequence of Instructions Creates an Affiliated Relationship," U.S. Appl. No. 15/680,759, filed Aug. 18, 2017, pp. 1-95.
Gschwind, Michael K. et al., "Concurrent Prediction of Branch Addresses and Update of Register Contents," U.S. Appl. No. 15/680,779, filed Aug. 18, 2017, pp. 1-95.
Gschwind, Michael K. et al., "Dynamic Fusion of Derived Value Creation and Prediction of Derived Values in a Subroutine Branch Sequence," U.S. Appl. No. 15/680,791, filed Aug. 18, 2017, pp. 1-97.
Gschwind, Michael K. et al., "Predicting and Storing a Predicted Target Address in a Plurality of Selected Locations ," U.S. Appl. No. 15/680,809, filed Aug. 18, 2017, pp. 1-97.
Gschwind, Michael K. et al., "Determining and Predicting Affiliated Registers Based on Dynamic Runtime Control Flow Analysis ," U.S. Appl. No. 15/680,824, filed Aug. 18, 2017, pp. 1-97.
Gschwind, Michael K. et al., "Predicting of an Affiliated Register," U.S. Appl. No. 15/680,871, filed Aug. 18, 2017, pp. 1-96.
Gschwind, Michael K. et al., "Code-Specific Affiliated Register Prediction," U.S. Appl. No. 15/680,881, filed Aug. 18, 2017, pp. 1-97.
List of IBM Patents or Patent Applications Treated as Related, Aug. 29, 2017, pp. 1-2.
International Search Report and Written Opinion for PCT-IB2018-055931 dated Dec. 5, 2018, pp. 1-9.
Muhammad Umar Farooq, Lei Chen, and Lizy Kurian John. "Value Based BTB Indexing for Indirect Jump Prediction" HPCA-16 2010 The Sixteenth International Symposium on High-Performance Computer Architecture. (Year: 2010).
International Search Report and Written Opinion for PCT-IB2018-055927 dated Dec. 12, 2018, pp. 1-8.
Hennessy et al, "Computer Archtecture—A Quantitative Approach," 5th Ed., selected pages. (Year: 2012).
List of IBM Patents or Applications Treated as Related, Dec. 16, 2019, 2 pgs.
"Determining and Predicting Derived Values", U.S. Appl. No. 16/562,959, filed Sep. 6, 2019, pp. (1-93).
"Code-Specific Affiliated Register Prediction", U.S. Appl. No. 16/562,906, filed Sep. 6, 2019, pp. (1-94).

\* cited by examiner

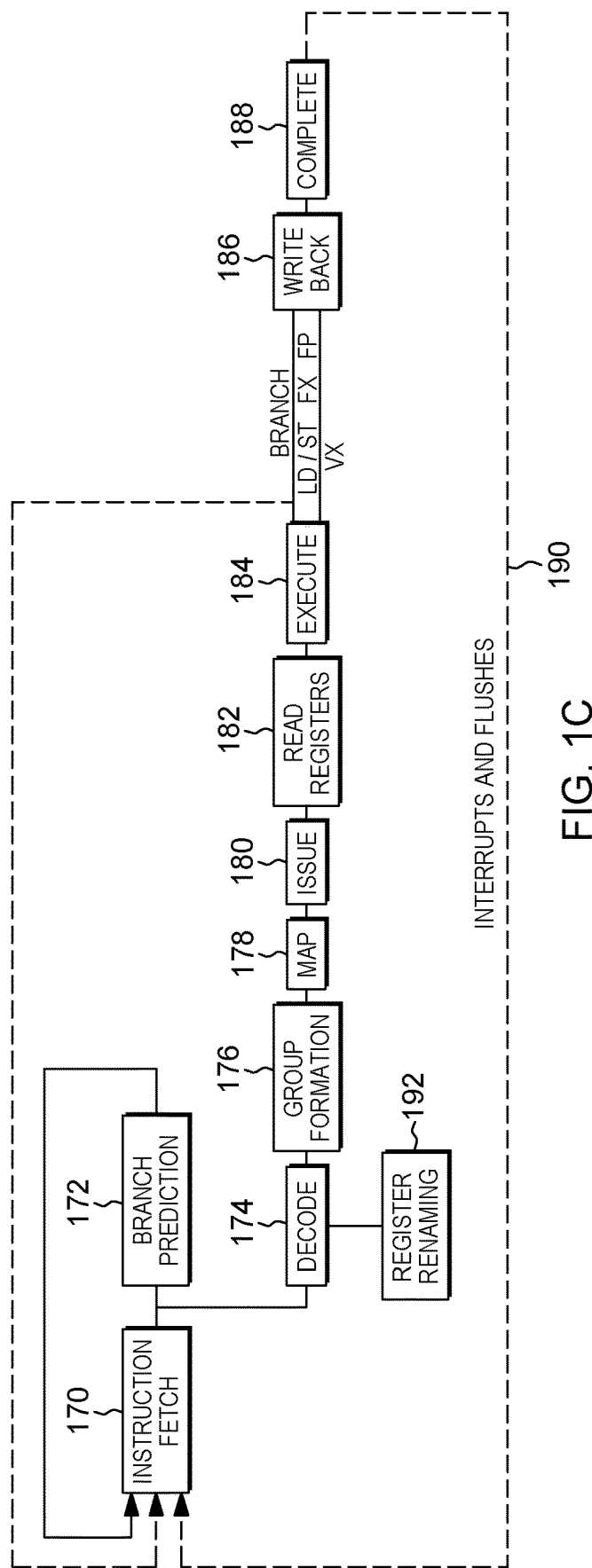

DETERMINING AND PREDICTING DERIVED VALUES USED IN REGISTER-INDIRECT BRANCHING

BACKGROUND

One or more aspects relate, in general, to processing within a computing environment, and in particular, to facilitating such processing.

Many computing systems use register-indirect branching, in which a location of the address of the next instruction to execute is specified in a branch instruction, instead of the address itself. For instance, a location of a register that includes the address is specified.

Further, in accordance with commonly used application binary interfaces (ABIs), a branch address is first loaded into a general purpose register (GPR), and then, transferred to a special purpose control register (SPR) before effecting a register-indirect branch. For instance, in the Power Instruction Set Architecture (ISA), offered by International Business Machines Corporation, Armonk, N.Y., a branch instruction branches to a counter (CTR) special purpose register. However, the special purpose register is not loaded directly, but via a general purpose register.

The counter register tends to be expensive to read-out. Therefore, at least one ABI indicates that the value of CTR is to be stored in another register, such as R12, when a branch to a subroutine (BCTR) is performed, enabling the other register to be used as a base register by the called function. However, when a branch prediction is made, the branch address may be predicted before the R12 value has been loaded, making the called subroutine stall responsive to a data access, and limiting performance.

SUMMARY

Shortcomings of the prior art are overcome and additional advantages are provided through the provision of a computer program product for facilitating processing within a computing environment. The computer program product comprises a computer readable storage medium readable by a processing circuit and storing instructions for performing a method. The method includes, for instance, predicting a predicted value to be used in register-indirect branching. The predicted value to be stored in one or more locations based on the prediction. An offset for a predicted derived value is obtained. The predicted derived value to be used as a pointer to a reference data structure providing access to variables used in processing. The predicted derived value is generated using the predicted value and the offset, and the predicted derived value is used to access the reference data structure during processing.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 1C depicts further details of one example of an instruction execution pipeline used in accordance with one or more aspects of the present invention;

DETAILED DESCRIPTION

Figure 1A:
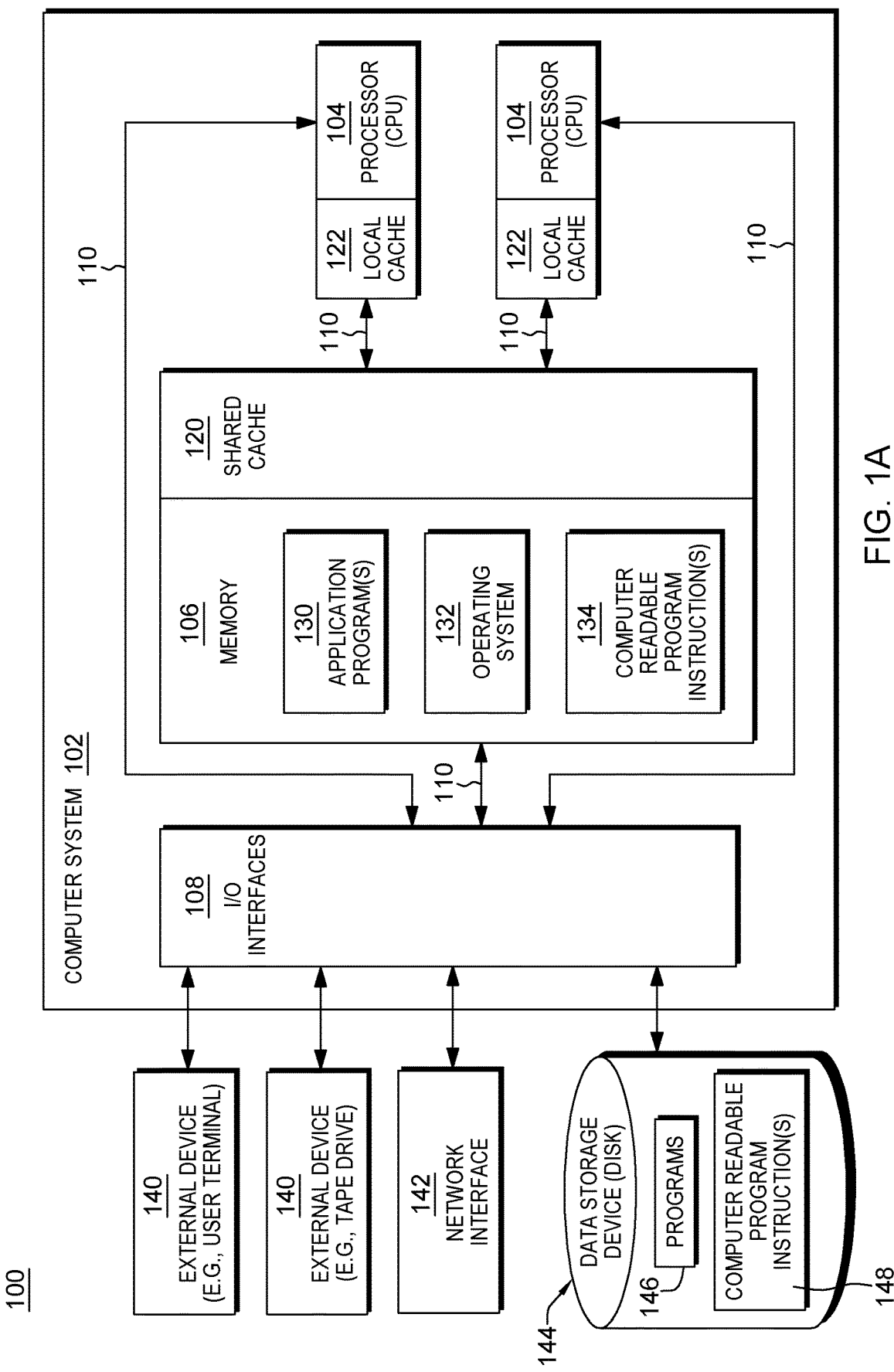
FIG. 1A depicts one example of a computing environment to incorporate and use one or more aspects of the present invention.

In accordance with one or more aspects, based on predicting a value of contents of a register (e.g., a target address of a target address register) to be used for register-indirect branches, the predicted value is stored in the register (e.g., the target address register, also referred to herein as a predicted register). The register in then available for future use. For instance, the contents of a target address register are updated and made available in conjunction with a predictive instruction fetch. When a target address is predicted, it is concurrently made available for both instruction fetch and for storage in a register or other selected location accessible to others (e.g., other instructions or operations). This allows others to use the predicted value.

As an example, the predicted register or location is a register or location other than a program counter that is automatically updated based on a prediction. It is, for instance, a register or location in addition to the program counter, such as a counter (CTR) register or other selected register/location. The target address, when predicted, is concurrently made available to the predicted register, in that one facility processes the register-indirect branch and stores the predicted target address. For instance, it is within the confines of one architected instruction (e.g., at the hardware/ software interface). Another architected instruction is not needed to copy or move the value to the predicted register/ location.

In a further aspect, in addition to predicting the value of contents of a register and storing the predicted value in the predicted register, the predicted value is also stored in another location, such as another register used to facilitate processing. This other location or register is referred to herein as an affiliated location or an affiliated register that stores the predicted value, which is used by other instructions. The affiliated register is one that is associated with the predicted register. For instance, an affiliated register has a known relationship with another register (e.g., the predicted register), such as being known as a copy of the other register. In one particular instance, both registers may be referenced by an instruction. As an example, the MTCTR R12 instruction moves the contents of R12 to the CTR register. Thus, R12 is affiliated with CTR. Other such examples exist.

In yet a further aspect, a control is provided to specify whether an affiliated register is to be used in prediction. If an affiliated register is to be predicted, the control also provides an indication of the affiliated register (e.g., a register number). This control is, for instance, code specific, and may be enabled/disabled for each unit of code, such as an application, process, function, module, or dynamically shared object (e.g., library), as examples.

In still a further aspect, the predicted value may be used to predict a value to be stored in an affiliated derived register (or other location) to further facilitate processing. An affiliated derived register is one in which its contents are derived from the contents of an affiliated register. For instance, the contents of R12 may be used, along with an offset, to obtain a value to be stored in a selected register, such as R2. Thus, R2, in this example, is an affiliated derived register. Other examples also exist.

Additionally, in one or more aspects, a particular sequence of instructions used in register-indirect branching and specifying one or more registers that may be predicted may be recognized, and based thereon, a sequence of operations performing operations of the particular sequence of instructions are fused to facilitate processing. That is, a fusion process is performed to combine one or more instructions into a single composite process of operations. That is, the sequence of instructions is to be treated as a whole.

Various aspects are described herein. Further, many variations are possible without departing from a spirit of aspects of the present invention. It should be noted that various aspects and features are described herein, and unless otherwise inconsistent, each aspect or feature may be combinable with any other aspect or feature.

One embodiment of a computing environment to incorporate and use one or more aspects of the present invention is described with reference to FIG. 1A. In one example, the computing environment is based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. Z/ARCHITECTURE is a registered trademark of International Business Machines Corporation, Armonk, N.Y., USA.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The computing environment may also be based on other architectures, including, but not limited to, the Intel x86 architectures. Other examples also exist.

As shown in FIG. 1A, a computing environment 100 includes, for instance, a computer system 102 shown, e.g., in the form of a general-purpose computing device. Computer system 102 may include, but is not limited to, one or more processors or processing units 104 (e.g., central processing units (CPUs)), a memory 106 (referred to as main memory or storage, as examples), and one or more input/output (I/O) interfaces 108, coupled to one another via one or more buses and/or other connections 110.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 120, such as a shared cache, which may be coupled to local caches 122 of processors 104. Further, memory 106 may include one or more programs or applications 130, an operating system 132, and one or more computer readable program instructions 134. Computer readable program instructions 134 may be configured to carry out functions of embodiments of aspects of the invention.

Computer system 102 may also communicate via, e.g., I/O interfaces 108 with one or more external devices 140, one or more network interfaces 142, and/or one or more data storage devices 144. Example external devices include a user terminal, a tape drive, a pointing device, a display, etc. Network interface 142 enables computer system 102 to communicate with one or more networks, such as a local area network (LAN), a general wide area network (WAN), and/or a public network (e.g., the Internet), providing communication with other computing devices or systems.

Data storage device 144 may store one or more programs 146, one or more computer readable program instructions 148, and/or data, etc. The computer readable program instructions may be configured to carry out functions of embodiments of aspects of the invention.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general purpose or special purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 1B:
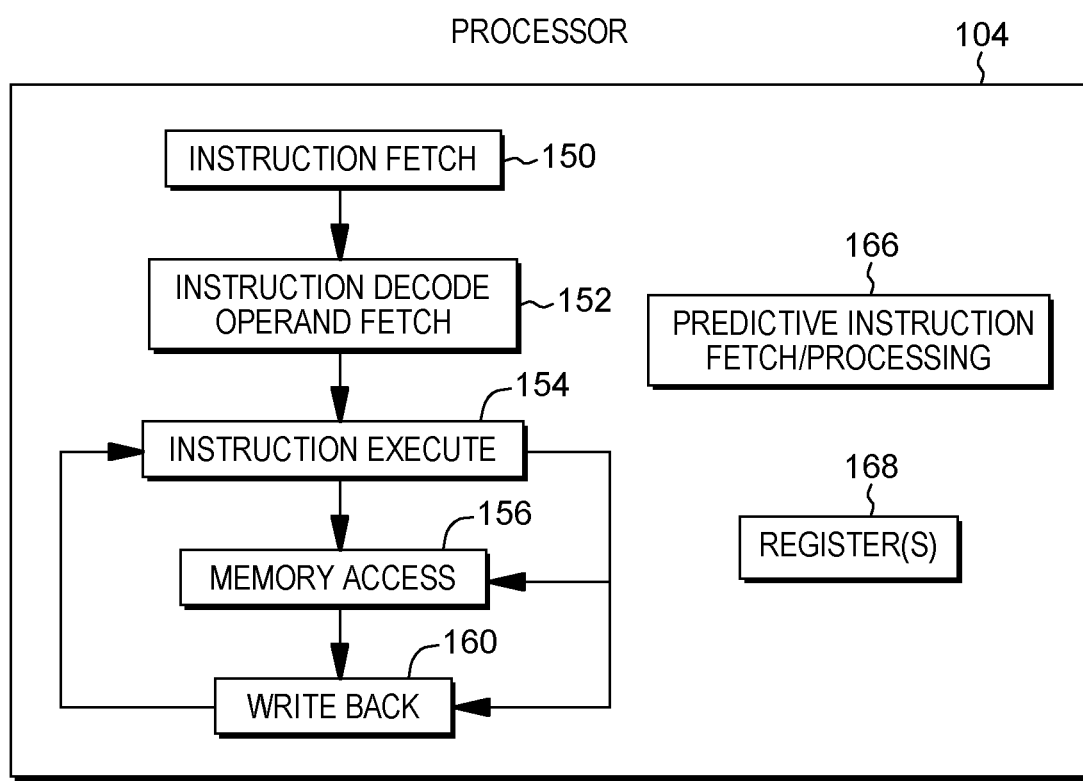
FIG. 1B depicts further details of a processor of FIG. 1A, in accordance with one or more aspects of the present invention.

Further details regarding one example of processor 104 are described with reference to FIG. 1B. Processor 104 includes a plurality of functional components used to execute instructions. These functional components include, for instance, an instruction fetch component 150 to fetch instructions to be executed; an instruction decode unit 152 to decode the fetched instructions and to obtain operands of the decoded instructions; instruction execution components 154 to execute the decoded instructions; a memory access component 156 to access memory for instruction execution, if necessary; and a write back component 160 to provide the results of the executed instructions. One or more of these components may, in accordance with one or more aspects of the present invention, be used to execute one or more instructions and/or operations associated with predictive instruction fetch and/or processing 166.

Processor 104 also includes, in one embodiment, one or more registers 168 to be used by one or more of the functional components. Processor 104 may include additional, fewer and/or other components than the examples provided herein.

Further details regarding an execution pipeline of processor 104 are described with reference to FIG. 1C. Although various processing stages of the pipeline are depicted and described herein, it will be understood that additional, fewer and/or other stages may be used without departing from the spirit of aspects of the invention.

Referring to FIG. 1C, in one embodiment, an instruction is fetched 170 from an instruction queue, and branch prediction 172 and/or decoding 174 of the instruction may be performed. The decoded instruction may be added to a group of instructions 176 to be processed together. The grouped instructions are provided to a mapper 178 that determines any dependencies, assigns resources and dispatches the group of instructions/operations to the appropriate issue queues. There are one or more issue queues for the different types of execution units, including, as examples, branch, load/store, floating point, fixed point, vector, etc. During an issue stage 180, an instruction/operation is issued to the appropriate execution unit. Any registers are read 182 to retrieve its sources, and the instruction/operation executes during an execute stage 184. As indicated, the execution may be for a branch, a load (LD) or a store (ST), a fixed point operation (FX), a floating point operation (FP), or a vector operation (VX), as examples. Any results are written to the appropriate register(s) during a write back stage 186. Subsequently, the instruction completes 188. If there is an interruption or flush 190, processing may return to instruction fetch 170.

Further, in one example, coupled to the decode unit is a register renaming unit 192, which may be used in the saving/restoring of registers.

Figure 1D:
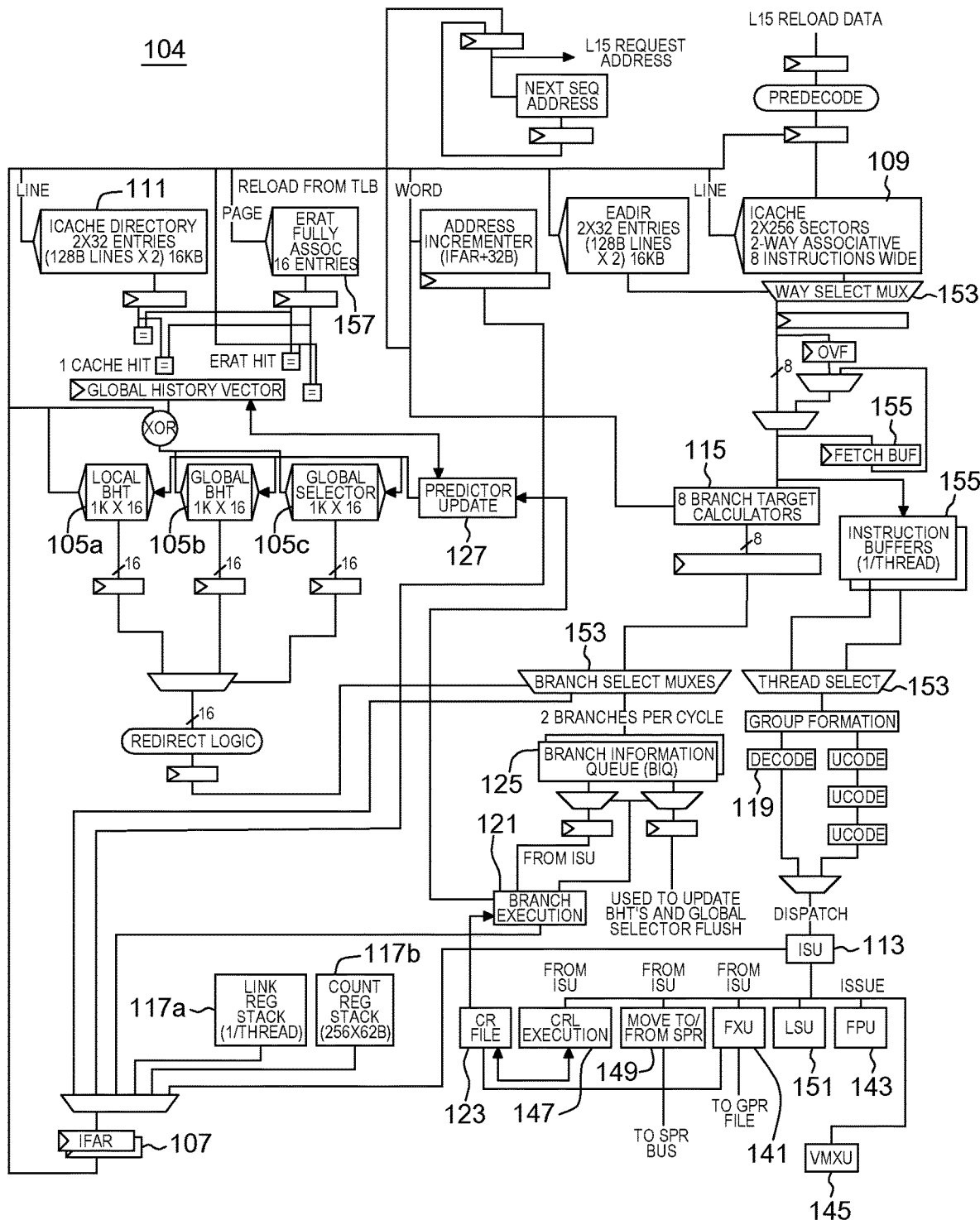
FIG. 1D depicts further details of one example of a processor of FIG. 1A, in accordance with an aspect of the present invention.

Additional details regarding a processor are described with reference to FIG. 1D. In one example, a processor, such as processor 104, is a pipelined processor that may include prediction hardware, registers, caches, decoders, an instruction sequencing unit, and instruction execution units, as examples. The prediction hardware includes, for instance, a local branch history table (BHT) 105a, a global branch history table (BHT) 105b, and a global selector 105c. The prediction hardware is accessed through an instruction fetch address register (IFAR) 107, which has the address for the next instruction fetch.

The same address is also provided to an instruction cache 109, which may fetch a plurality of instructions referred to as a "fetch group". Associated with instruction cache 109 is a directory 111.

The cache and prediction hardware are accessed at approximately the same time with the same address. If the prediction hardware has prediction information available for an instruction in the fetch group, that prediction is forwarded to an instruction sequencing unit (ISU) 113, which, in turn, issues instructions to execution units for execution. The prediction may be used to update IFAR 107 in conjunction with branch target calculation 115 and branch target prediction hardware (such as a link register prediction stack 117a and a count register stack 117b). If no prediction information is available, but one or more instruction decoders 119 find a branch instruction in the fetch group, a prediction is created for that fetch group. Predicted branches are stored in the prediction hardware, such as in a branch information queue (BIQ) 125, and forwarded to ISU 113.

A branch execution unit (BRU) 121 operates in response to instructions issued to it by ISU 113. BRU 121 has read access to a condition register (CR) file 123. Branch execution unit 121 further has access to information stored by the branch scan logic in branch information queue 125 to determine the success of a branch prediction, and is operatively coupled to instruction fetch address register(s) (IFAR) 107 corresponding to the one or more threads supported by the microprocessor. In accordance with at least one embodiment, BIQ entries are associated with, and identified by an identifier, e.g., by a branch tag, BTAG. When a branch associated with a BIQ entry is completed, it is so marked. BIQ entries are maintained in a queue, and the oldest queue entries are deallocated sequentially when they are marked as containing information associated with a completed branch. BRU 121 is further operatively coupled to cause a predictor update when BRU 121 discovers a branch misprediction.

When the instruction is executed, BRU 121 detects if the prediction is wrong. If so, the prediction is to be updated. For this purpose, the processor also includes predictor update logic 127. Predictor update logic 127 is responsive to an update indication from branch execution unit 121 and configured to update array entries in one or more of the local BHT 105a, global BHT 105b, and global selector 105c. The predictor hardware 105a, 105b, and 105c may have write ports distinct from the read ports used by the instruction fetch and prediction operation, or a single read/write port may be shared. Predictor update logic 127 may further be operatively coupled to link stack 117a and count register stack 117b.

Referring now to condition register file (CRF) 123, CRF 123 is read-accessible by BRU 121 and can be written to by the execution units, including but not limited to, a fixed point unit (FXU) 141, a floating point unit (FPU) 143, and a vector multimedia extension unit (VMXU) 145. A condition register logic execution unit (CRL execution) 147 (also referred to as the CRU), and special purpose register (SPR) handling logic 149 have read and write access to condition register file (CRF) 123. CRU 147 performs logical operations on the condition registers stored in CRF file 123. FXU 141 is able to perform write updates to CRF 123.

Processor 104 further includes, a load/store unit 151, and various multiplexors 153 and buffers 155, as well as address translation tables 157, and other circuitry.

Processor 104 executes programs (also referred to as applications) that use hardware registers to store information. Programs that call routines, such as functions, subroutines or other types of routines, are responsible for saving registers used by the caller (i.e., the programs calling the routines) and for restoring those registers upon return from the callee (the called routine). Likewise, the callee is responsible for saving/restoring registers that it uses, as shown in the code examples provided below.

Further, many computing systems use base registers for addressing data and/or code. For example, System/360 (System z), offered by International Business Machines Corporation, uses a branch and link register (BALR) instruction and a USING directive to create an index for addressing of data and code. As a further example, Power Systems use a branch and link (BL) instruction with an offset (e.g., BL. +4) to create a program counter (PC) address in a register to use for data addressing in position independent code (PIC). Other systems similarly use base registers for addressing data and code.

As indicated, different sequences have been used to establish addressability. For instance, sequences have been used in which the program counter (PC) value is loaded in the callee function, or the provided function call address is used. This offers the ability to provide a known value represented by the current instruction address, but may use an expensive sequence. Conversely, using the specified function entry address results in a simpler sequence, but depends on a potentially long dependence chain to establish the entry point address. The following examples describe sequences previously used to establish addressability.

One example of code for System/360 (System z) is depicted below: The following System/360 assembly code shows the structure of subroutine calls commonly used to call a subroutine in mainframe systems based on the System/360 architecture:

```
...
l    r15=A(subr)      ! load address of subroutine subr in r15
balr r14,r15          ! save return address in r14 and set
...                   !   pc to contents of r15
```

The following System/360 (System z) assembly code shows the structure of called subroutine calls in mainframe systems based on the System/360 architecture:

```
subr:
    stm    r14, r12,    ! store multiple registers into caller's
           12 (r13)
                        !     save area (r14, r15, r0,...,r12)
    balr r12, 0         ! set address in r12 for use as base reg
    using *, r12        ! pseudo-op to tell assembler to use r12
    la r11, savearea    ! load address of my save area
    st r13, savearea+4  ! store address of caller's save area
    st r11, 8 (r13)     ! store address of my save area in caller's
                        !     save area
    ... body of subroutine...
    ... r0 is used for return code, if present ...
    l r13, savearea+4   ! load address of caller's save area
    lm     r14, r12,    ! load multiple registers from caller's
           12 (r13)       save area
                        !     (r14, r15, r0, ..., r12)
    br     r14          ! return to caller
```

Further, one example of code for a system based on the Power architecture is depicted below. The following Power architecture assembly code shows the structure of subroutine calls commonly used to call a subroutine in Power systems based on the Power architecture:

```
...
lwz    r15=A(subr)    ! load address of subroutine subr in r15
mtctr r15             ! ctr = r15
bctrl                 ! save return address in lr and set
                      ! pc to contents of ctr
...
```

The following Power architecture assembly code shows the structure of called subroutine calls in Power systems based on the Power architecture:

```
subr:
    stmw r10, r4,          ! store multiple registers into
    12 (r13)               caller's save area
                           !     (r14, r15, r0, ..., r12)
    mflr      r0           ! Save lr
    bl .+4                 ! Get PC to LR
base:mflr     r12          ! Use address in r12 as base reg
    mtlr      r0           ! Restore LR
    ... body of subroutine ...
    lwz       r11, (savearea-base) @1, ! load data from
              r12                      Global
                           !           Offset Table (GOT)
    ... r0 is used for return code, if present ...
    blr                    ! return to caller
```

Loading the program counter as a base, as in the above examples, incurs overhead. For instance, for System/360, the code includes an extra balr r12, 0 instruction, and on Power Systems, there is an extra set of instructions, including mflr/bl.+4/mflr/mtlr. Thus, in one code transformation, the function entry point is also used as a base, as shown below.

One example of System/360 code that includes the function entry point as a base is a follows:

```
...
l  r12=A(subr)         ! load address of subroutine subr in r12
balr    r14, r12       ! save return address in r14 and set
                       ! pc to contents of r12
...
subr:
    using *, r12       ! pseudo-op to tell assembler to use r12
                       as base
    stm     r14, r12,  ! store multiple registers into caller's
            12 (r13)   save area
                       !     (r14, r15, r0, ..., r12)
    la r11, savearea   ! load address of my save area
    st r13, savearea+4 ! store address of caller's save area
    st r11, 8 (r13)    ! store address of my save area in caller's
                       save area
    ... body of subroutine ...
    ... r0 is used for return code, if present ...
    l r13, savearea+4  ! load address of caller's save area
    lm    r14, r12,    ! load multiple registers from caller's
          12 (r13)     save area
                       !     (r14, r15, r0, ..., r12)
    br    r14          ! return to caller
```

One example of code based on the Power architecture is as follows:

```
...
```

```
lwz    r15=A(subr)   ! load address of subroutine in r15
mtctr  r15           ! ctr = r15
bctrl                ! save return address in lr and set
                     ! pc to contents of ctr
...
subr:
base: stmw    r10, r4,   ! store multiple registers into caller's
              12 (r13)
                         !     save area (r14, r15, r0, ..., r12)
      mfctr r12          ! move address in ctr to r12 as base reg
      ... body of subroutine ...
      lwz     r11, (savearea-base)@1,  ! load data from
              r12                      global
                                    !  offset table (GOT)
      ... r0 is used for return code, if present ...
      blr                ! return to caller
```

While the above transformation allows the target address to be available for executing the branch to enter the subroutine, the address may not be available during speculative execution after a branch prediction until the time when the target address becomes available to validate the prediction. For instance, the address is not available, at the time of prediction, in a register or other selected location (different from the program counter) accessible by other instructions or operations. Thus, in accordance with an aspect of the present invention, based on a branch predictor predicting a register-indirect branch address, the predicted value is also made available as a speculative value in, for instance, an architected register. Then, if the prediction is correct, execution proceeds faster. If the prediction is incorrect, recovery is taken, as it would have based on the misprediction.

Figure 2:
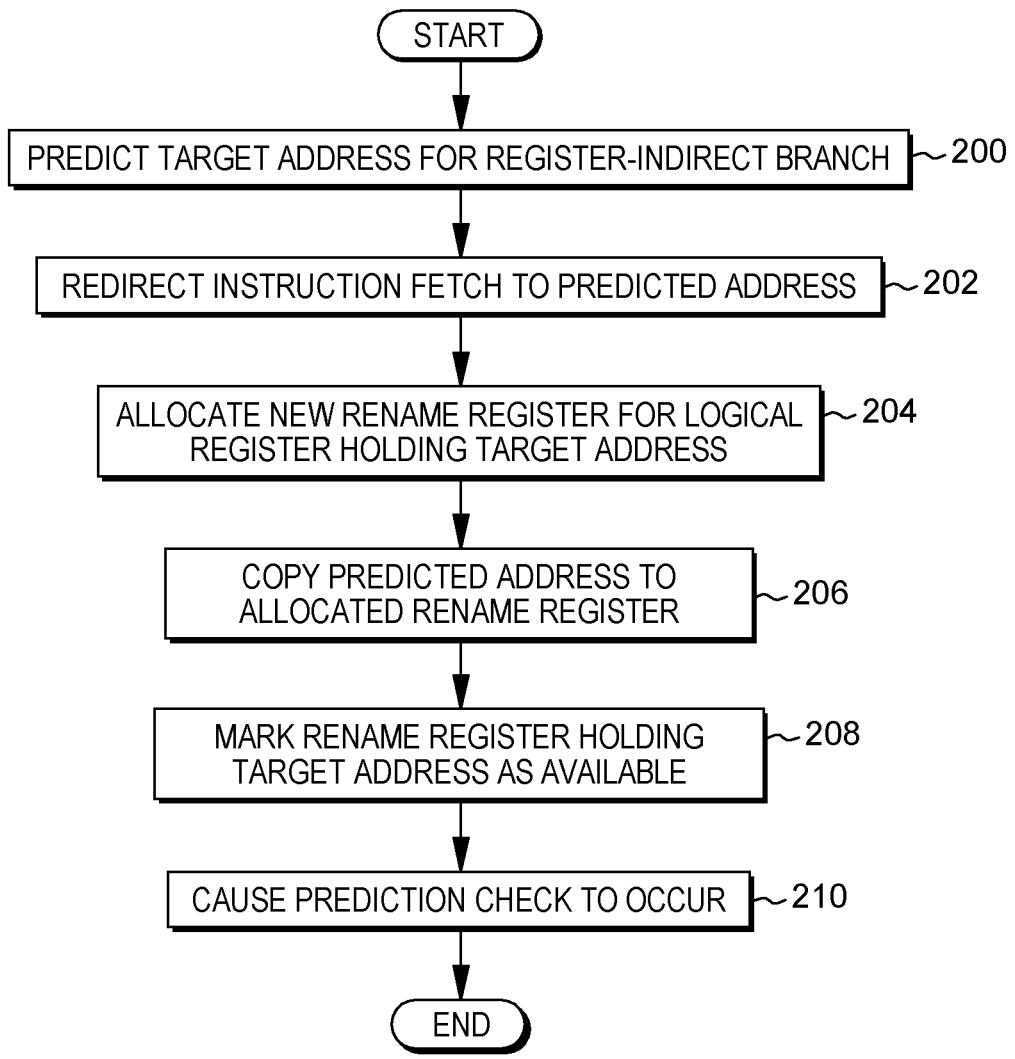
FIG. 2 depicts one example of processing associated with prediction for a register-indirect branch, in accordance with an aspect of the present invention.

Further details regarding a prediction technique for a register-indirect branch are described with reference to FIG. 2. In one example, a processor is performing this processing. Initially, the target address for a register-indirect branch is predicted, STEP 200, and the instruction fetch is redirected to the predicted target address (also referred to herein as a predicted address), STEP 202. Further, in one example, a new rename register is allocated for the logical register holding the target address, STEP 204. That is, in one embodiment, register renaming is used for recovery. With register renaming, a new rename register is allocated on a branch, and the new rename register is loaded with the predicted value. The prediction is checked, and if the prediction is incorrect, recovery is performed by returning to the previously named register.

As indicated, the predicted address is copied to the allocated rename register, STEP 206. The rename register holding the target address is marked as available, STEP 208. Further, a prediction check is performed to determine whether the prediction is correct, STEP 210. There are a number of ways in which to cause a prediction check to occur, including starting a state machine which will perform the check when the target register value provided to the branch instruction becomes available; inserting an internal operation (iop) for checking; or causing a branch operation to be issued to a checking pipeline, etc.

If there is a misprediction, recovery is performed. There are a number of recovery implementation options that may be used, including copying the correct value from the old register to the new register; or using a renaming implementation in which the newly allocated rename register is discarded and the rename map points to a previous physical register holding the correctly loaded value. Further details regarding example recovery implementations performed, e.g., by a processor, are described with reference to FIGS. 3-4.

Figure 3:
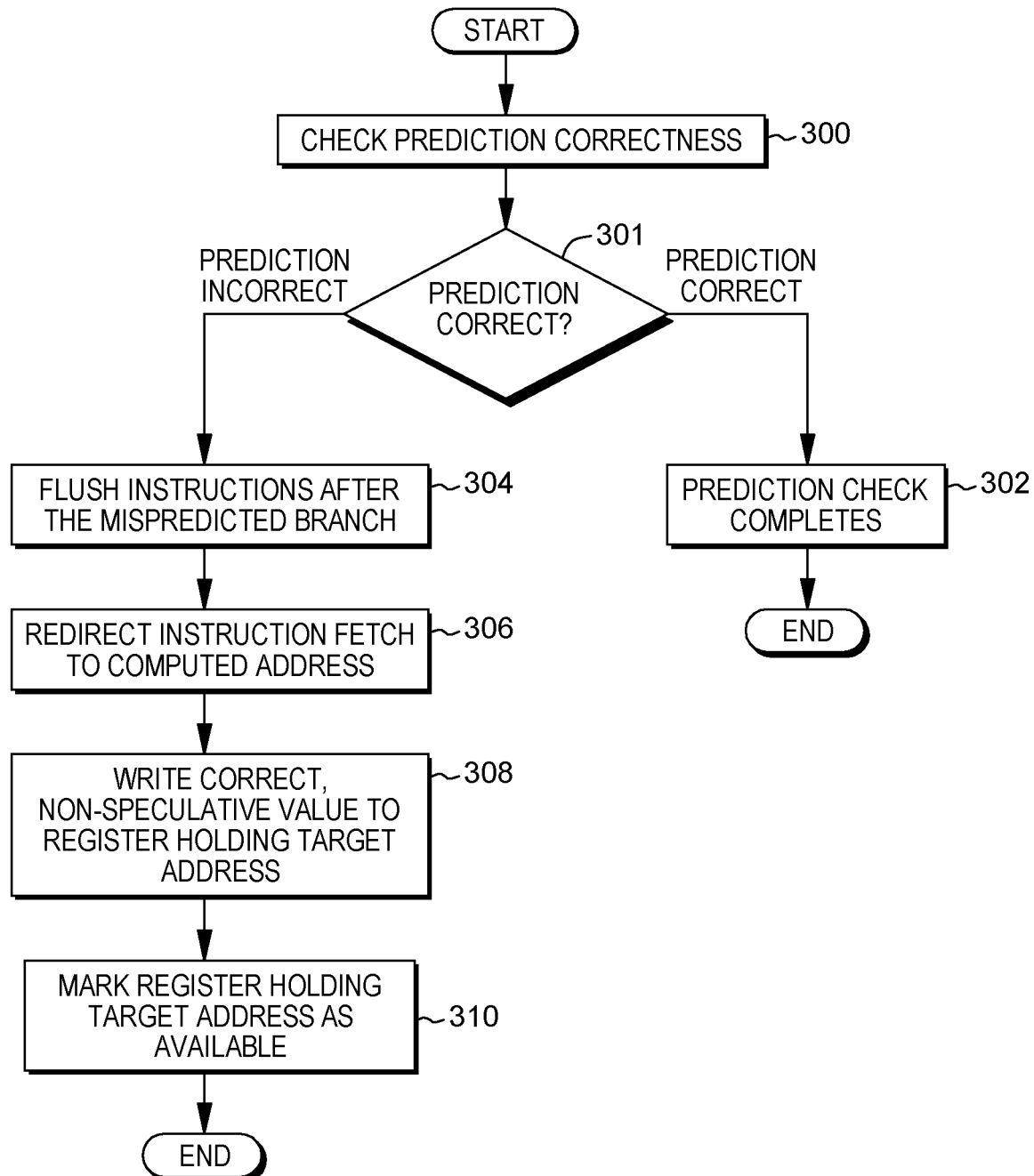
FIG. 3 depicts one example of checking prediction correctness, in accordance with an aspect of the present invention.

Referring initially to FIG. 3, in one embodiment, a check for branch prediction correctness is performed, STEP 300. This includes taking the predicted address and comparing it to an actual address computed as input to the branch instruction when it becomes available. If the prediction is correct, INQUIRY 301, then the prediction check is complete, STEP 302, and recovery is not needed.

However, if the prediction is incorrect, INQUIRY 301, then instructions after the mispredicted branch are flushed, STEP 304. Further, the instruction fetch is redirected to the computed address, STEP 306. Additionally, the correct non-speculative value is written to the register holding the target address, STEP 308. There may be a number of ways to accomplish this including in a non-rename design, writing to an active register. Further, in a rename design, writing to an existing rename register or allocating a new rename register. The register holding the target address is marked as available, STEP 310. This completes one example of the prediction check.

Figure 4:
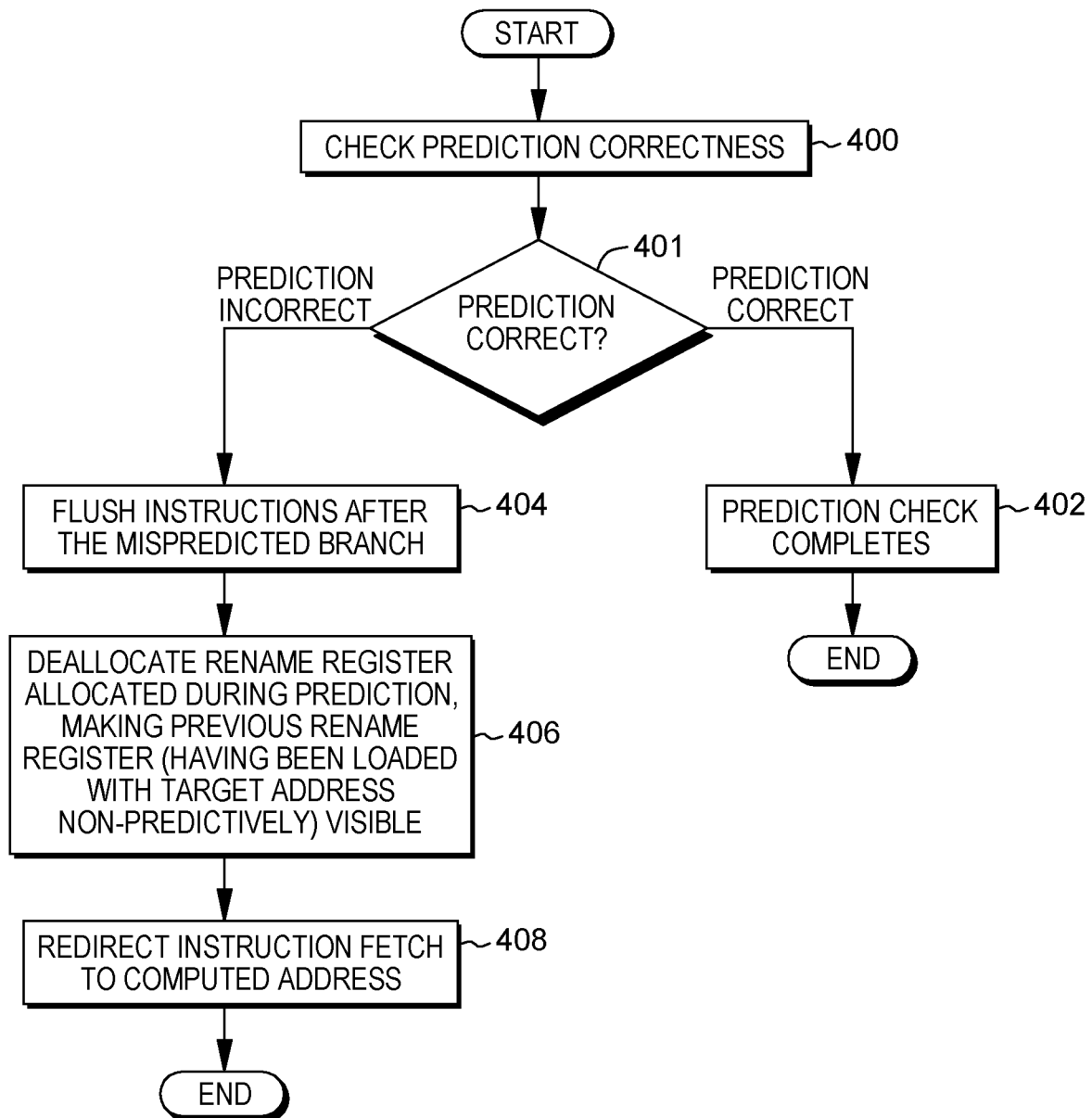
FIG. 4 depicts another example of checking prediction correctness, in accordance with an aspect of the present invention.

In another embodiment, referring to FIG. 4, a prediction check technique for a register-indirect branch is provided that explicitly uses register renaming. In this example, a check is made of branch prediction correctness, STEP 400. If the prediction is correct, INQUIRY 401, then the check is complete, STEP 402, and recovery is not performed. However, if the prediction is incorrect, INQUIRY 401, then the instructions after the mispredicted branch are flushed, STEP 404, and the rename register allocated during prediction is deallocated, making the previous rename register with the non-speculative target address visible, STEP 406. The instruction fetch is then redirected to the computed address, STEP 408. This completes one example of the prediction check.

Advantageously, the technique of FIG. 4 corresponds to branch processing as currently implemented in many out-of-order processors, in which registers allocated after a branch instruction are automatically deallocated, provided the register allocated in conjunction with the processing of the branch instruction is treated as a register allocated after the execution of the branch instruction. In an embodiment where the target register allocated in conjunction with the branch instruction is not treated as allocated after the branch instruction and not deallocated, an implementation in accordance with FIG. 3 may be adapted to update the rename register having been allocated to hold the speculative value with a correct, non-speculative value.

In another embodiment, non-renaming annotations may be used, in which, for instance, two copies of the base are provided. Then, on prediction, a switch is made to the second or new copy. The prediction copies the predicted value into the new copy, and future instructions use the newly enabled copy. The prediction is checked, and if there is a misprediction, the old copy is used. In one such implementation, misprediction recovery is performed by updating the active copy of the target register, i.e., in which the old (non-predictive) copy is pointed to and the second copy is made active as the next new base value on the next prediction. Further implementations are also possible.

As described herein, based on predicting contents (e.g., a value; a target address) of a register to be used for a register-indirect branch, the predicted contents that are used for the prediction are also stored (e.g., concurrently) in the register to be used for the register-indirect branch so that it may be used by other instructions. This facilitates processing.

In a further aspect, the predicted value that is written into the target address register (and, e.g., the program counter) is also written into an affiliated register. For instance, if the predicted value is to be written into a counter register, CTR, which is the target address register, it is also written into another selected register, such as R12, R15, or other register, affiliated with the CTR register.

For certain processing, such as with commonly used ABIs, a branch address is first to be loaded into a general purpose register (GPR), and then, transferred to a special purpose control register (SPR) before effecting a register-indirect branch. In accordance with one such example of a branch architecture, the Power ISA branches to a counter (CTR) special purpose register. However, the special purpose register (e.g., the counter register, CTR) is not loaded directly, but is loaded via a general purpose register.

Since the counter register may be expensive to read out, one example ABI further indicates that the value of CTR is to be stored in a selected register, e.g., R12, R15, or other register, when a branch to a subroutine (BCTR) is performed. This enables the selected register to be used as a base register by the called function. However, when a branch prediction is made, the branch address may be predicted before the value of the selected register has been loaded, making the called subroutine stall responsive to a data access.

Previously, to provide the value in the selected register, such as R12 in this example, a move from CTR (MFCTR) to R12 was performed that reads the CTR register and writes the result in R12. However, in accordance with one definition of an ABI, such as, for example, the Power ELF v2 ABI, if a value is made available in CTR, that value is also made available in R12. Thus, the move from CTR to R12 is not needed because software already indicates that whatever is in the CTR register is also to be written in R12, eliminating the copy. However, in accordance with an aspect of the present invention, if a register is predicted, then the predicted value for that register is made available in that register. Thus, if the predicted register is CTR, CTR is concurrently updated. The application, however, wants to read R12, which has not been updated, and because there is no copy, there is no software path to get the predicted value that is in CTR into R12. R12 is an affiliated register; it is related, but it is not a copy necessarily seen in the code. Therefore, in accordance with an aspect of the present invention, the same value that is predicted for CTR and written into CTR is also written into R12 (or another selected register or location).

Thus, in accordance with an aspect of the present invention, an affiliated register is predicted in conjunction with a branch prediction of one or more types of subroutine branches. This is described in further detail below.

Figure 5:
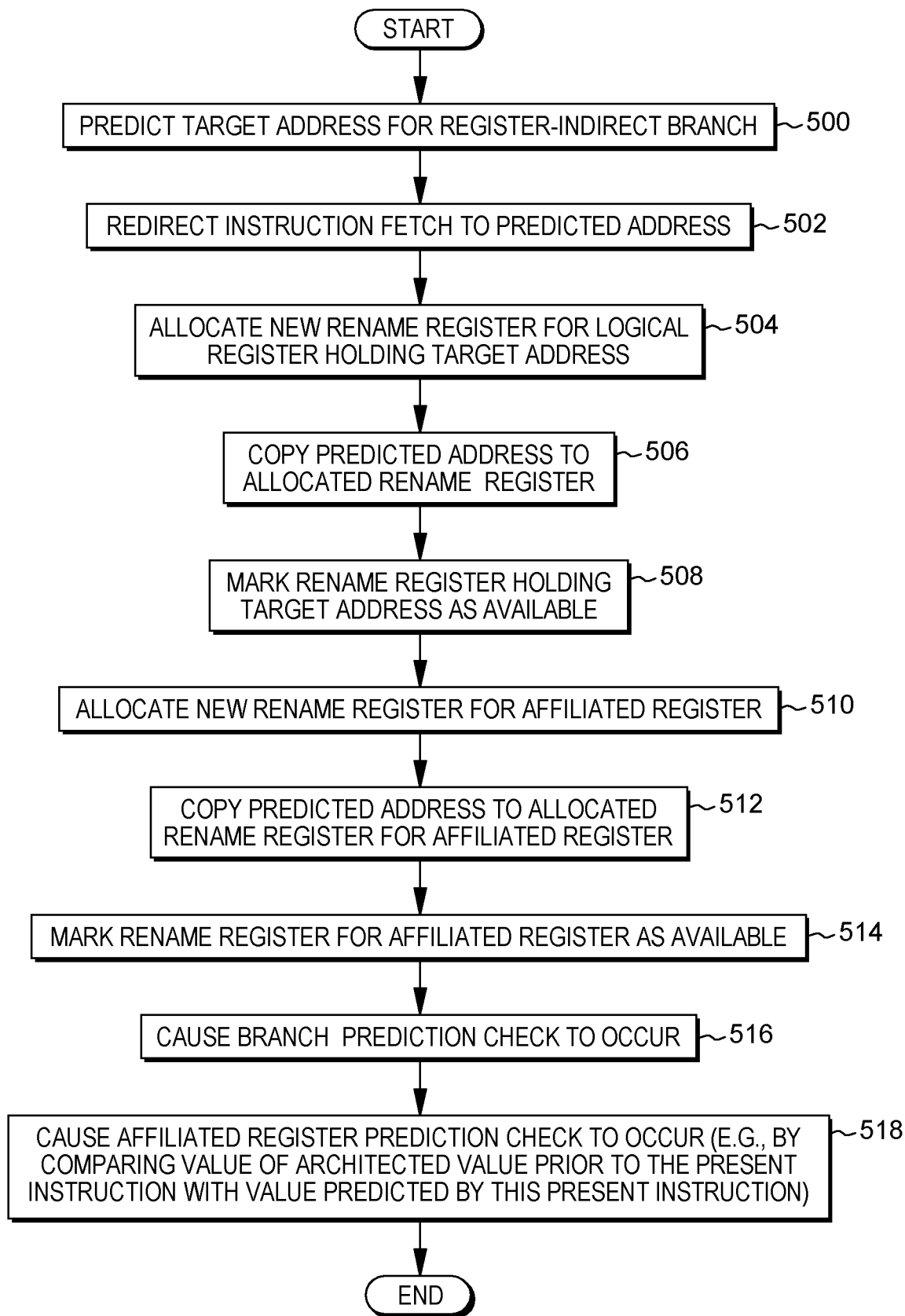
FIG. 5 depicts one example of processing associated with prediction for a register-indirect branch and an affiliated register, in accordance with an aspect of the present invention.

One example of a prediction technique for a register-indirect branch that also predicts an affiliated register is described with reference to FIG. 5. In one example, a processor is performing this processing. Initially, the target address for a register-indirect branch is predicted, STEP 500, and the instruction fetch is redirected to the predicted target address, STEP 502. Further, in one example, a new rename register is allocated for the logical register holding the target address, STEP 504, and the predicted address is copied to the allocated rename register, STEP 506. The rename register holding the target address is marked as available, STEP 508.

Additionally, in accordance with an aspect of the present invention, a new rename register is also allocated for the affiliated register, STEP 510. The predicted address is copied to the rename register allocated for the affiliated register, STEP 512, and the rename register for the affiliated register is marked as available, STEP 514.

A prediction check is performed to determine whether the branch prediction is correct, STEP 516, an example of which is described herein. Additionally, a prediction check is performed for the affiliated register, STEP 518. This check includes, for instance, comparing a value of the architected value prior to the present instruction being processed responsive to which the affiliated register is being predicted with the value predicted by this present instruction. The check may be initiated by starting a state machine, inserting an IOP for checking, or causing a branch operation to be issued to a checking pipeline with an indication to check the affiliated value. Many variations are possible.

Further details associated with a branch prediction check are described with reference to FIG. 6, and further details of a prediction check to check the prediction of the affiliated register are described with reference to FIG. 7. In these examples, register renaming is used. However, other implementations are possible without using register renaming. In one example, a processor is performing this processing.

Figure 6:
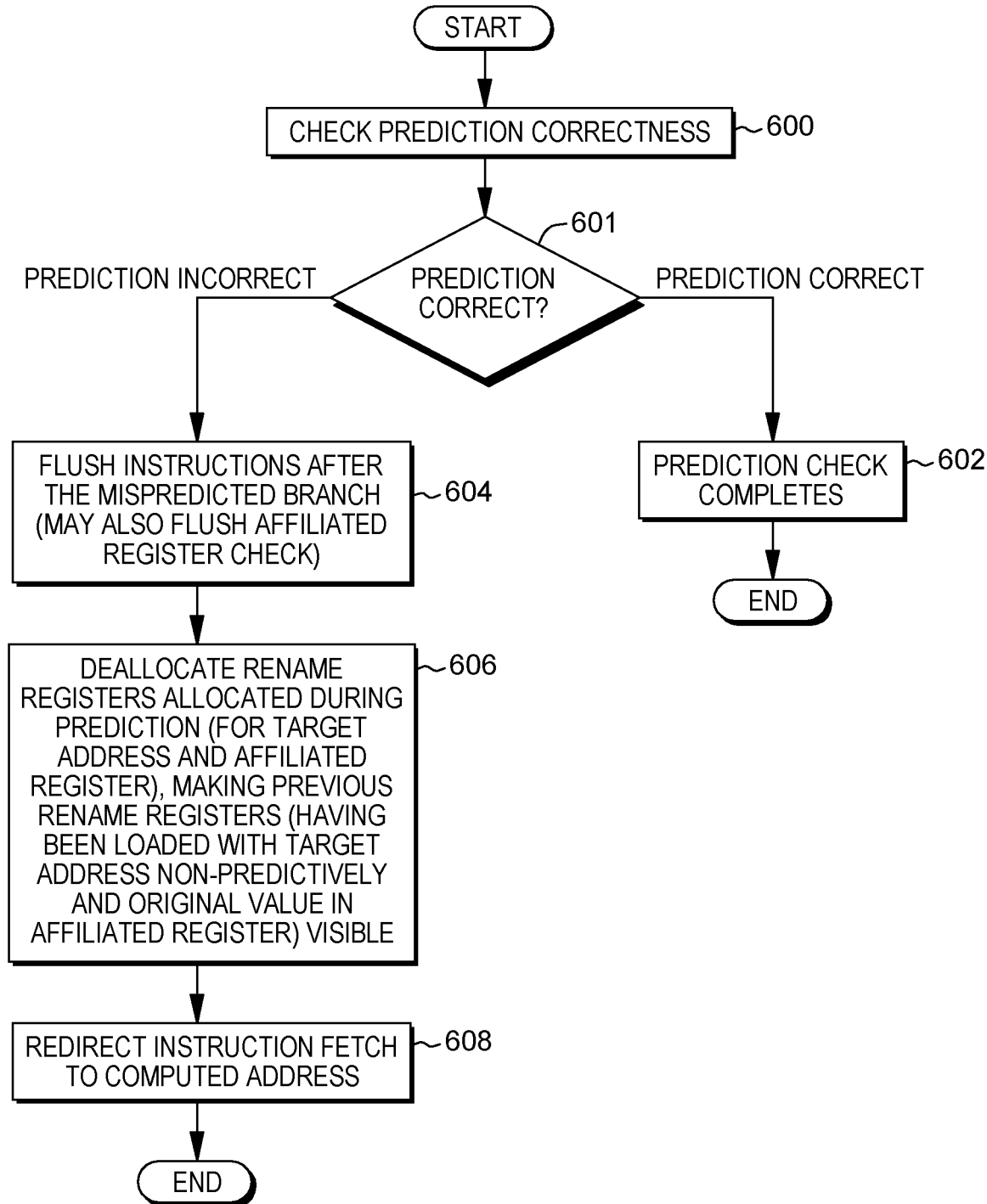
FIG. 6 depicts another example of checking prediction correctness, in accordance with an aspect of the present invention.
Figure 7:
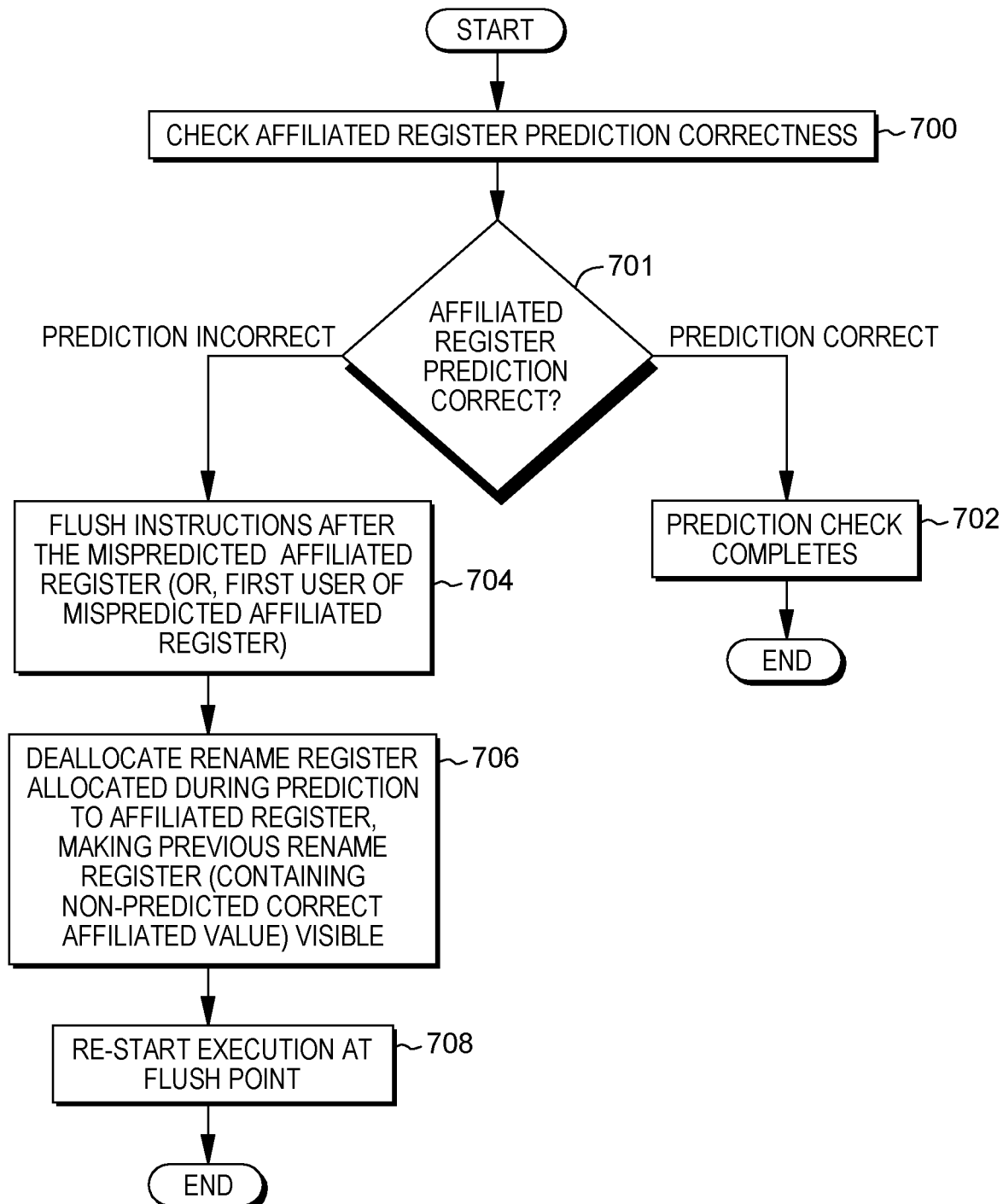
FIG. 7 depicts an example of checking prediction correctness for affiliated registers, in accordance with an aspect of the present invention.

Referring initially to FIG. 6, in one example, a check is made of the correctness of the branch prediction, STEP 600. If the branch prediction is correct, INQUIRY 601, then the check is complete, STEP 602, and recovery is not performed. However, if the branch prediction is incorrect, INQUIRY 601, then recovery is performed. For example, the instructions after the mispredicted branch are flushed, STEP 604. This may include the check of the affiliated register. Further, the rename registers allocated during prediction (e.g., target address register and affiliated register) are deallocated, making the previous rename registers with the non-speculative target address and the original value in the affiliated register visible, STEP 606. The instruction fetch is then redirected to the computed address, STEP 608. This completes one implementation of the branch prediction check.

In one example, the prediction of the affiliated register may be checked separate from the check of the branch prediction. Thus, further details regarding checking, by e.g., a processor, the prediction of the affiliated register are described with reference to FIG. 7. In one example, correctness of the prediction of the affiliated register is checked, STEP 700. If the affiliated register prediction is correct, INQUIRY 701, then the check is complete, STEP 702, and recovery is not performed. However, if the affiliated register prediction is incorrect, INQUIRY 701, then recovery is performed. For instance, the instructions after the mispredicted affiliated register (or first user of mispredicted affiliated register) are flushed, STEP 704, and the rename register allocated during prediction for the affiliated register is deallocated, making the previous rename register that includes the non-predicted correct affiliated value visible, STEP 706. Execution is then restarted at the flush point, STEP 708. This completes one example of the affiliated register prediction check.

In one aspect of checking a prediction, the checking compares the predicted value of the affiliated register to the most recent value of the affiliated register computed prior to the instruction which triggers the prediction of the affiliated register. In at least one embodiment, that value is stored in a rename register.

In another embodiment, recovery of a misprediction is performed by copying a value of the affiliated register prior to the instruction which triggers the prediction of the affiliated register to the rename register allocated to hold the predicted value of the affiliated register. In at least one embodiment, recovery by restoring a value is used when deallocating a rename register is more expensive than copying the correct value to the allocated rename register.

As described herein, based on predicting contents (e.g., a value; a target address) of a register to be used for a register-indirect branch, the predicted contents that are used for the prediction are also stored (e.g., concurrently) in the register to be used for the register-indirect branch (in addition to the program counter), as well as in an affiliated register, so that the value may be used by other instructions. This facilitates processing.

In another aspect, a control is provided to specify whether an affiliated register is to be used in prediction. Further, if it is indicated that the affiliated register is to be used, the control may include an indication of the affiliated register to be used (e.g., a register number). This control is, for instance, code specific, and may be enabled/disabled for each unit of code, such as an application, a process, a module, a function, or a dynamically shared object (e.g., library), as examples.

In one aspect, one or more controls are provided for predicting affiliated registers, in which a first set of units of code benefits from prediction of affiliated register values, and a second set of units of code does not. Many variations are possible.

As one example, the control is provided in a machine state register (MSR). The operating system sets the MSR control for one unit of code and disables the MSR control for another unit of code. In another embodiment, a page table entry (PTE) control may be provided. For example, a bit in the PTE controls prediction or non-prediction for an affiliated register for branches on the page where the branch is located, the page corresponding to a page whose address is translated by the PTE. In another embodiment, a bit in the PTE controls prediction or non-prediction of an affiliated register for branches based on the setting of the bit for the page of the target address of the branch, the address of the branch target being translated by the PTE. In yet other embodiments, hybrid forms are supported, wherein the MSR bit enables, for example, consideration of a bit set in the PTE. Many other examples are possible.

In one example of a PTE control, a bit in the PTE is set by the dynamic loader based on a module or page level indication of a program module, e.g., describing the module's characteristics, such as ABI level used for a particular segment of code.

In at least one embodiment, a static linker links modules so as to group functions into common pages when they use a common ABI level, and separates them into separate pages when they do not.

In another embodiment, a module shares the ABI level, i.e., the code in a single module corresponds to the same ABI level, and the level and implied setting for this control is supplied, e.g., by a module header, such as the ELF (Executable Linkable Format) magic number. Many examples and variations are possible. The example controls described herein are just examples.

The use of a control to indicate whether affiliated register prediction is to be used for a unit of code is referred to herein, for convenience, as externally indicated affiliated register prediction (EIARP). One embodiment of using externally indicated affiliated register prediction for a unit of code is described with reference to FIG. 8. In one example, this processing is performed by an operating system executing on a processor of a computing environment.

Figure 8:
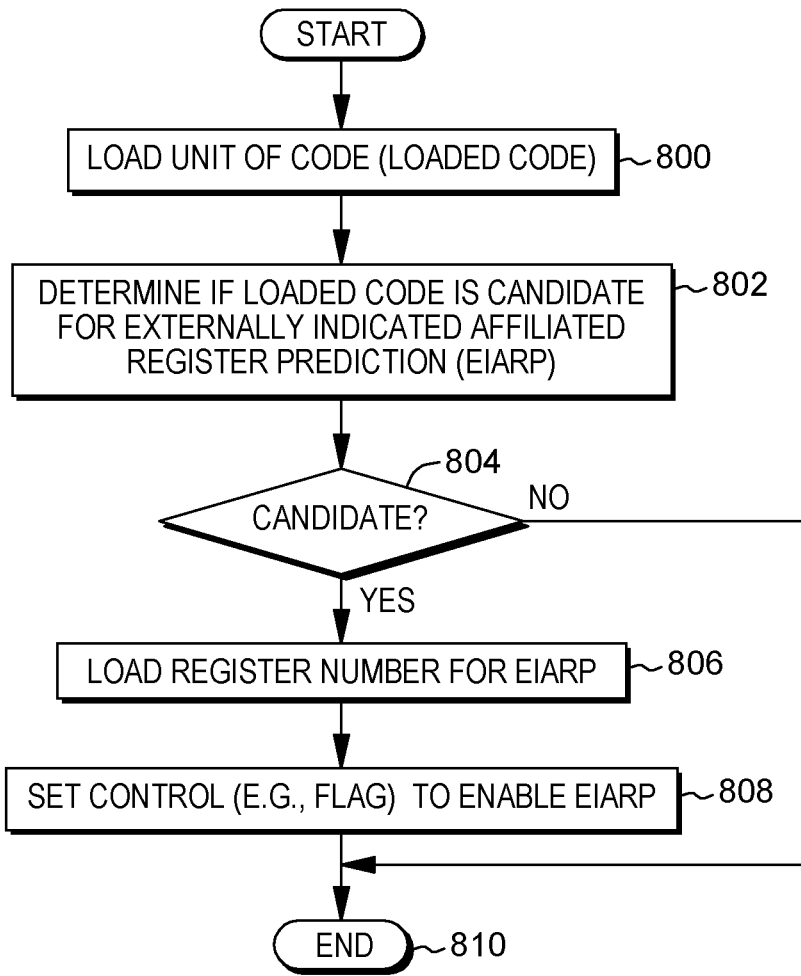
FIG. 8 depicts one example of processing associated with externally indicated affiliated register prediction (EIARP), in accordance with an aspect of the present invention.

Referring to FIG. 8, initially, the operating system loads a unit of code, such as an application, process, module, function, or dynamically shared object, etc., STEP 800. A determination is made as to whether the unit of code (referred to herein as loaded code or code) is a candidate for code specific externally indicated affiliated register prediction, STEP 802. This may be determined by, for instance, checking the ABI version or an EIARP indicator of the code provided in a header or magic number of the code, as examples.

If the code is not a candidate for externally indicated affiliated register prediction, INQUIRY 804, processing is complete, STEP 810. Otherwise, an indication of the affiliated register (e.g., a register number) is loaded into a control register, STEP 806. Example control registers include a machine state register (MSR), a program status word (PSW), a special purpose register (SPR), a page table entry (PTE) on a page basis, or a segment table entry (STE), as just a few examples.

Additionally, a control (e.g., a flag or other indicator) may be set that enables EIARP for the loaded code, STEP 808. In one example, the flag or other indicator is set in a control register or other control field, such as in a MSR, PSW, SPR, PTE or STE, as examples. This reduces the risk of excessive misprediction and recovery penalties.

In another embodiment, a control is set to indicate that a code unit is not subject to EIARP, when INQUIRY 804 determines that the code is not a candidate for affiliated register prediction, based on the code characteristics (e.g., ABI level).

In other embodiments, the code is loaded by one of a program loader, a dynamic program loader, a shared library loader, a dynamic library loader, or another system component adapted to loading code.

In one embodiment, when there is a context switch of the operating system, the configuration is updated (e.g., by the operating system), including the code specific EIARP. The updating of the code specific EIARP due to a context switch is, e.g., performed when the control is located in a register that is not specifically bound to the unit of code, such as in a MSR, SPR, or PSW. Since the PTE is bound to the code, the EIARP configuration does not need to be updated, in one example. One embodiment of context switching logic associated with the code specific EIARP is described with reference to FIG. 9.

Figure 9:
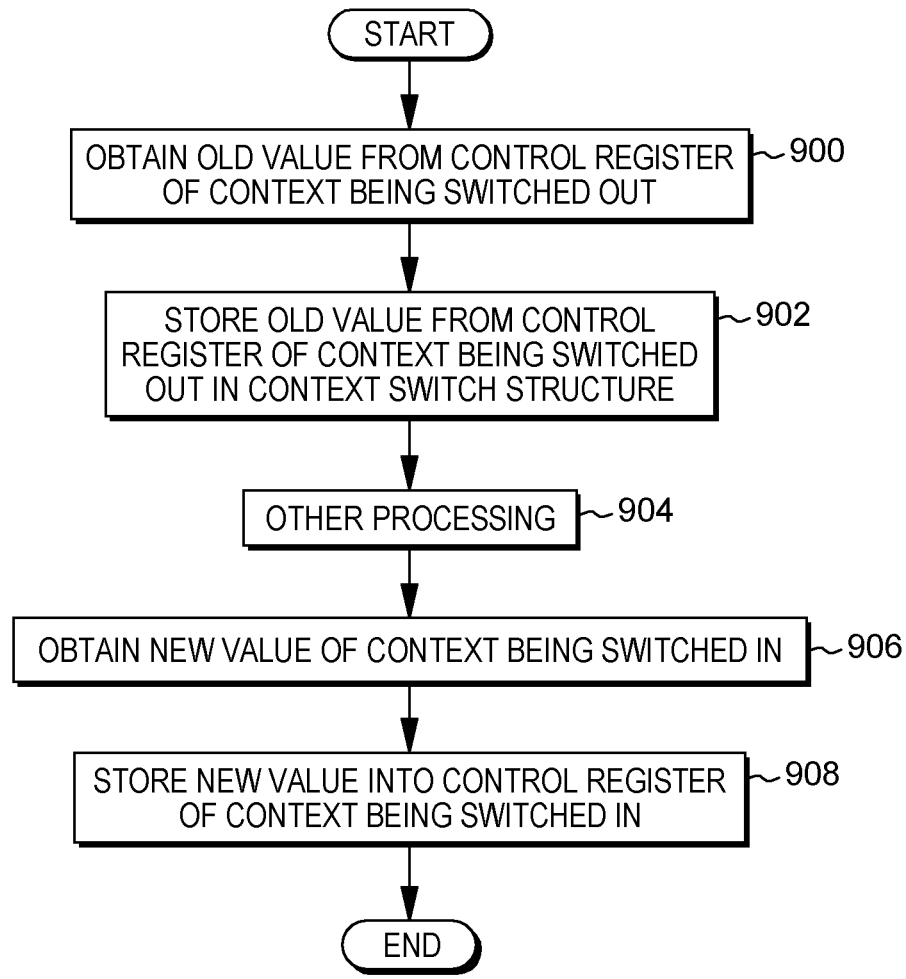
FIG. 9 depicts one example of processing associated with a context switch and externally indicated affiliated register prediction, in accordance with an aspect of the present invention.

Referring to FIG. 9, based on a context switch, a value from the control register of the context being switched out is obtained, STEP 900, and stored in a context switch structure, STEP 902. Other processing may be performed, STEP 904. Additionally, a new value of the context being switched in is obtained, STEP 906, and stored into a control register of the context being switched in, STEP 908.

In other embodiments, the value for the control register is stored in an applicant's context structure when the value is initially established, e.g., in conjunction with the processing of the technique of FIG. 8, and STEPS 900 and 902 to preserve the code's settings are omitted during the context switch process. Other variations are also possible.

During processing, a program may take a hardware exception (e.g., page fault, floating point exception, etc.), and switch to the operating system via interrupt processing. In one embodiment, when there is a switch to the operating system, the configuration settings may be disabled (e.g., by the operating system), as described with reference to FIG. 10.

In one example, the value of the control register of the context being switched out is obtained, STEP 1000, and stored into an exception context, STEP 1002. Example exception contexts include, for instance, in low memory for System z, or select registers for Power Systems, such as SRR0/SRR1 . . . or HSRR0/HSRR1 . . . , as examples. The exception context may include the code specific EIARP and/or other configuration information. Other processing may be performed, STEP 1004. Further, optionally, a supervisor initialization value may be stored in a control register, such as in a MSR, SPR, etc., STEP 1006. Additional and/or other processing may also be performed.

Subsequent to handling the exception, hardware exception/interruption processing is exited. One example of this processing, which is performed, e.g., by a processor, is described with reference to FIG. 11. In one example, the code specific EIARP and/or other configuration information to be restored is obtained from the exception context, STEP 1100, and stored in a selected control register (e.g., MSR, SPR, PSW, etc.), STEP 1102.

Figure 12:
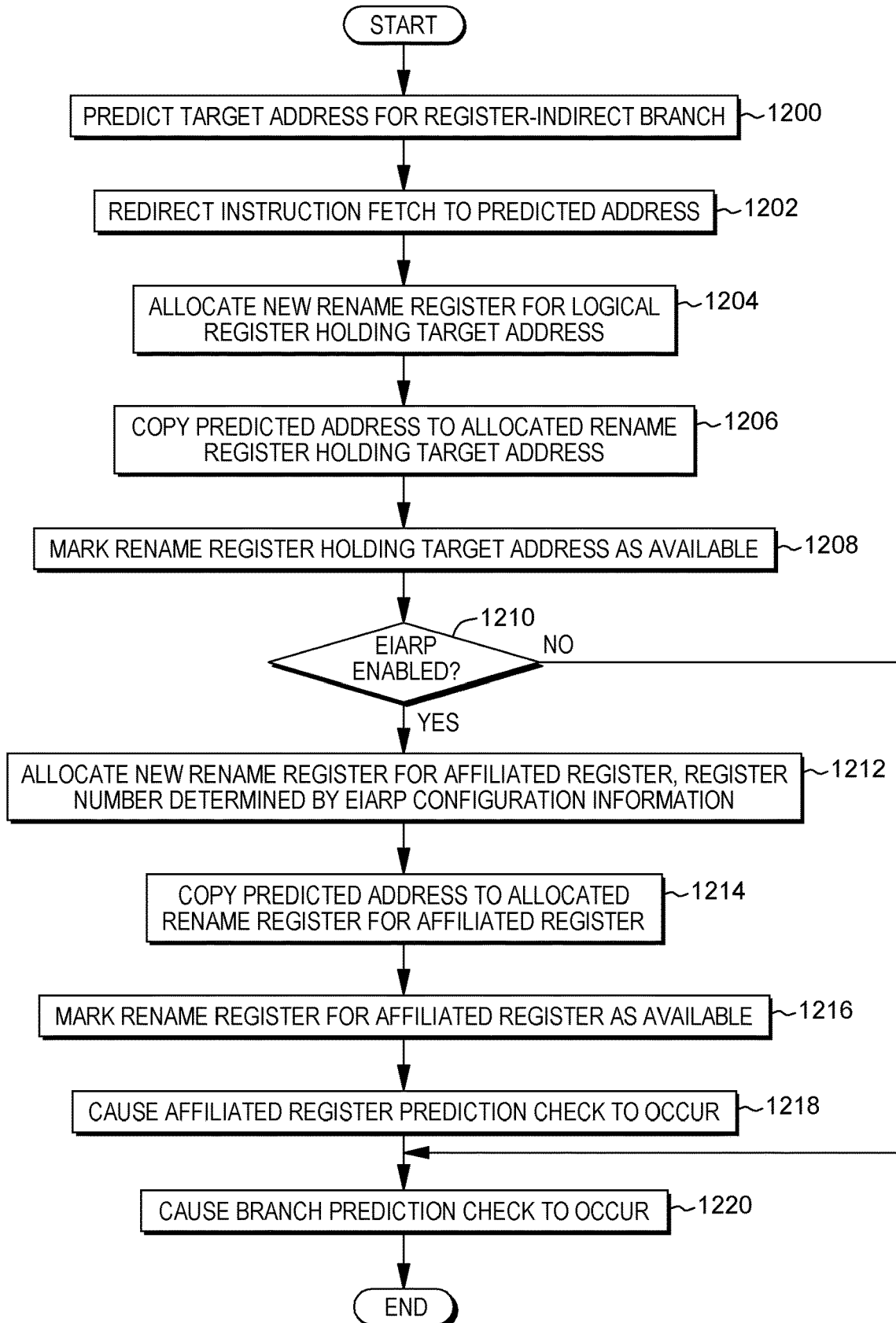
FIG. 12 depicts one example of processing associated with prediction for a register-indirect branch and the use of externally indicated affiliated register prediction, in accordance with an aspect of the present invention.

Further details of using a code specific EIARP with branch prediction are described with reference to FIG. 12. In one example, a processor is performing this processing. In one embodiment, the target address for a register-indirect branch is predicted, STEP 1200, and the instruction fetch is redirected to the predicted target address, STEP 1202. Further, in one example, a new rename register is allocated for the logical register holding the target address, STEP 1204. The predicted address is copied to the allocated rename register, STEP 1206, and the rename register holding the target address is marked as available, STEP 1208.

Further, in accordance with an aspect of the present invention, a determination is made as to whether EIARP is enabled for the code, INQUIRY 1210. This is determined, for instance, by checking a control indicating whether an affiliated register is to be predicted for the code. If EIARP is not enabled for the code, then processing continues with causing a check of the branch prediction to occur, STEP 1220. Otherwise, a new rename register is also allocated for the affiliated register, STEP 1212. The register number of the affiliated register is determined by, e.g., EIARP configuration information. Further, the predicted address is copied to the rename register allocated for the affiliated register, STEP 1214, and the rename register for the affiliated register is marked as available, STEP 1216.

A check of the prediction of the affiliated register is performed to determine whether the affiliated register prediction is correct, STEP 1218. This includes, for instance, comparing a value of the architected value prior to the present instruction being processed responsive to which the affiliated register is being predicted with the value predicted by this present instruction.

Additionally, a check of the branch prediction is performed, STEP 1220. Examples of check prediction correctness logic are described herein. Examples are also described with reference to FIGS. 14-15 described below. Other examples are also possible.

In yet a further aspect, a prediction is made as to whether an affiliated register may be predicted. This prediction is based, for instance, on dynamic predictive determination of affiliation status for an affiliated register candidate (e.g., branch instruction). A processor, in one example, dynamically determines the scope of affiliated register for each candidate branch subroutine instruction which may have an affiliated register. The branch instructions, the specific affiliated register candidates and the enablement of the dynamic affiliation determination may be controlled by a variety of control registers, including an MSR bit, a PTE bit, other control registers, or a combination thereof. It may further include a control register specifying a candidate for affiliation or a bitmask, determining multiple candidates for affiliation.

In accordance with one or more aspects, a candidate is predicted as affiliated, and a prediction is made, based on a predictor. A check of the prediction is performed in the processor. If the prediction was incorrect, because the affiliated register is not affiliated, a dynamic predictor is updated to suppress future affiliated prediction.

There are a plurality of techniques that may be employed to find new dynamic affiliation relationships. One such technique includes, for instance, a random guess of affiliation when a predictor indicates non-affiliation (at a sufficiently low rate), to identify either actual changed behavior or changed behavior due to aliasing where another branch becomes dominant. Another technique includes, for example, training periods in which the operating system determines to force new affiliations to be predicted, either at a fixed interval, or responsive to provided changes, e.g., as determined with a variety of dynamic runtime monitoring and fingerprint taking techniques. Other techniques are also possible.

In one aspect, a prediction is made as to whether a defined register (either statically defined or defined in an EIARP configuration, as examples) is affiliated for a specific instance (e.g., a specific branch). In this aspect, a unit of code (e.g., a branch instruction) is loaded, and a defined register number (e.g., R12) is hardwired in the hardware or loaded in a configuration or control register (e.g., MSR, PSW, SPR, PTE, STE, etc.). Optionally, a flag to enable prediction for the unit of code is also set.

If the register number is loaded in a configuration or control register, and not hardwired, processing is performed, based on a context switch, since each unit of code may have different configuration information. An example of this processing is described with reference to FIG. 9.

Figure 10:
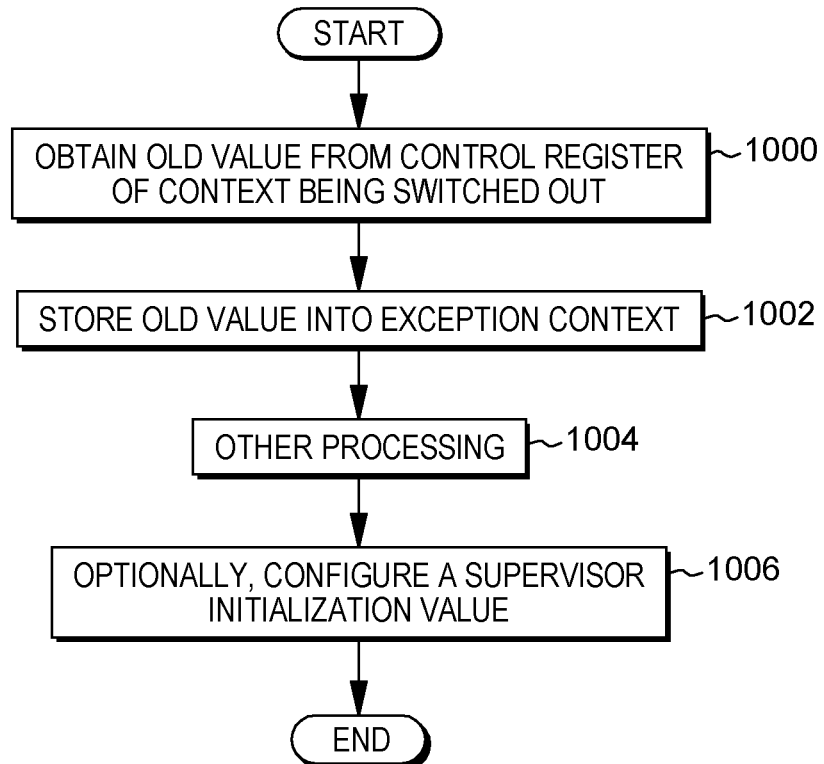
FIG. 10 depicts one example of processing associated with entering hardware exception/interrupt processing, in accordance with an aspect of the present invention.
Figure 11:
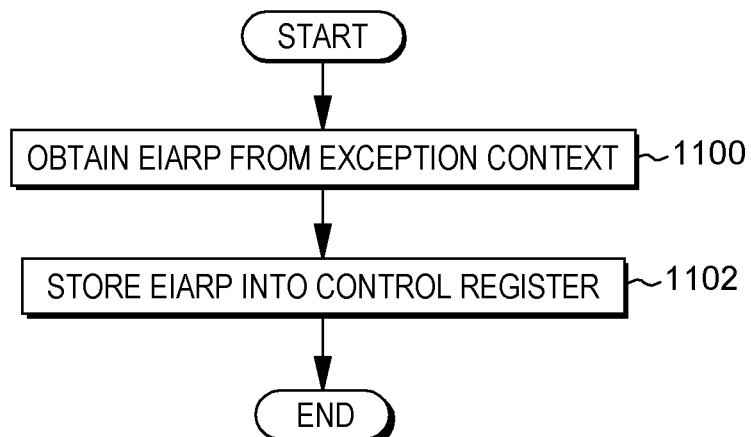
FIG. 11 depicts one example of processing associated with exiting hardware exception/interrupt processing, in accordance with an aspect of the present invention.

Similarly, if a hardware exception is taken and the register number is not hardwired, exception processing may be performed, as described, in one embodiment, with reference to FIGS. 10 and 11.

Figure 13:
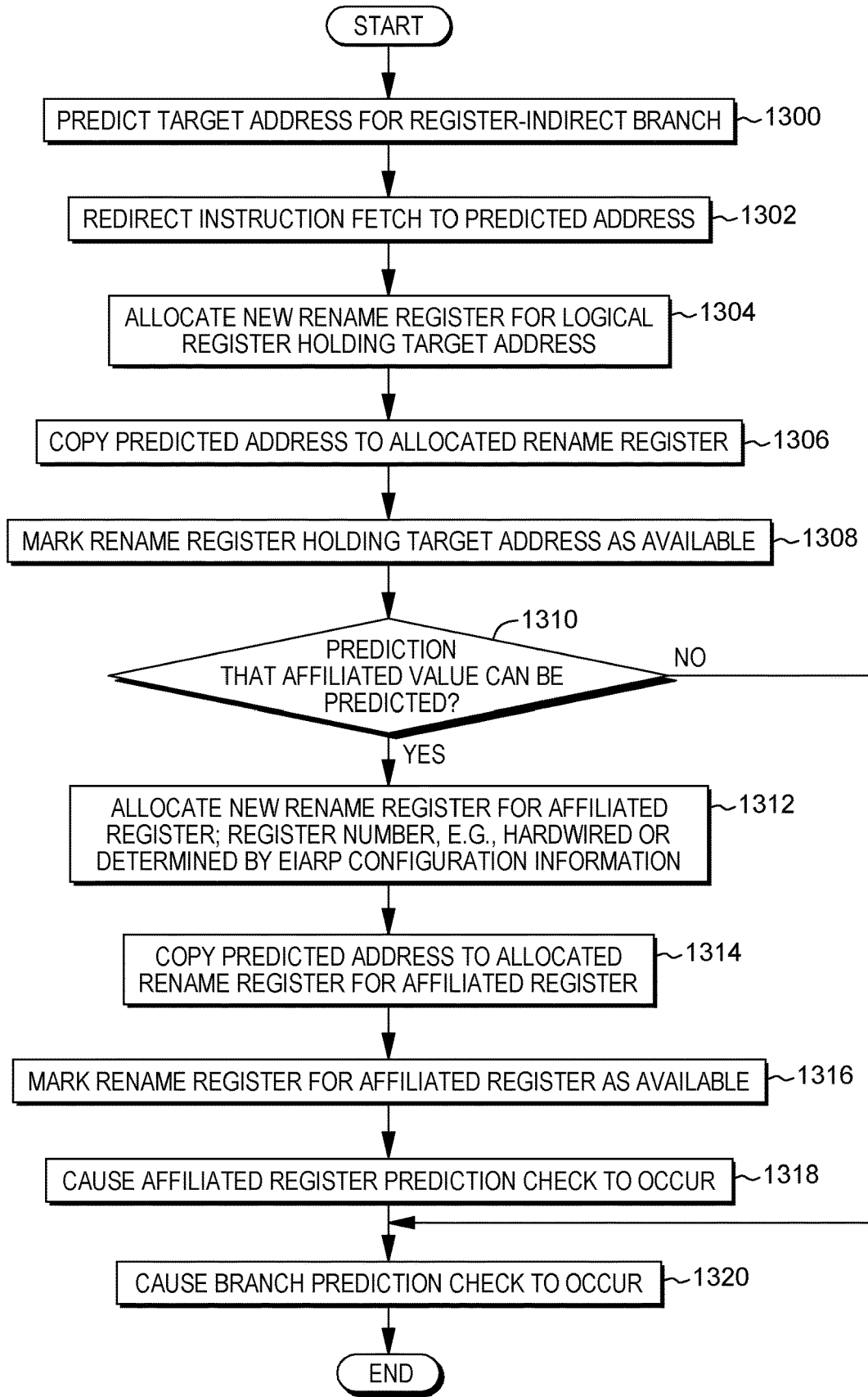
FIG. 13 depicts one example of processing associated with prediction for a register-indirect branch and for predicting whether an affiliated register may be predicted, in accordance with an aspect of the present invention.

One example of a prediction technique for a register-indirect branch that also predicts whether a defined register is affiliated is described with reference to FIG. 13. In one example, a processor is performing this processing. In one example, initially, the target address for a register-indirect branch is predicted, STEP 1300, and the instruction fetch is redirected to the predicted target address, STEP 1302. Further, in one example, a new rename register is allocated for the logical register holding the target address, STEP 1304. The predicted address is copied to the allocated rename register, STEP 1306, and the rename register holding the target address is marked as available, STEP 1308.

Further, a determination is made as to whether the affiliated value may be predicted, INQUIRY 1310. For instance, may the affiliated register be predicted? If not, then processing continues with causing a branch prediction check to occur, STEP 1320. Otherwise, in one embodiment, a new rename register is allocated for the affiliated register being predicted, STEP 1312. The register number of the affiliated register may be hardwired or determined by EIARP configuration information, as examples.

The predicted address is copied to the allocated rename register for the affiliated register, STEP 1314, and the rename register for the affiliated register is marked as available, STEP 1316.

A check of the prediction of the affiliated register is performed to determine whether the prediction is correct, STEP 1318, as well as a check of the branch prediction, STEP 1320, as described herein. If there is a misprediction, recovery is performed, as described with reference to FIGS. 14-15. In one example, a processor is performing this processing.

In one or more embodiments, INQUIRY 1310 may be subject to a control override to discover new affiliated registers. In one embodiment, INQUIRY 1310 is forced to indicate an affiliated register during a training phase. A training phase may correspond, for example, to a fixed or configurable number of cycles after an application has been loaded. In another example, a training phase may correspond, for example, to a fixed or configurable number of cycles after an indication to start a training phase. In one example, a start of training indication may correspond to one of a randomly generated signal at a fixed or configurable probability. In another example, a start of training indication may correspond to the passing of a specified interval since the last training phase, e.g., a fixed or configurable number of cycles, or a fixed or configurable number of nanoseconds, microseconds, or another time unit. In another embodiment, INQUIRY 1310 indicates the presence of an affiliated register for a first number of executions of a branch; the first number being fixed or configurable. Yet other embodiments may employ other known or future techniques to train an affiliated register predictor.

Figure 14:
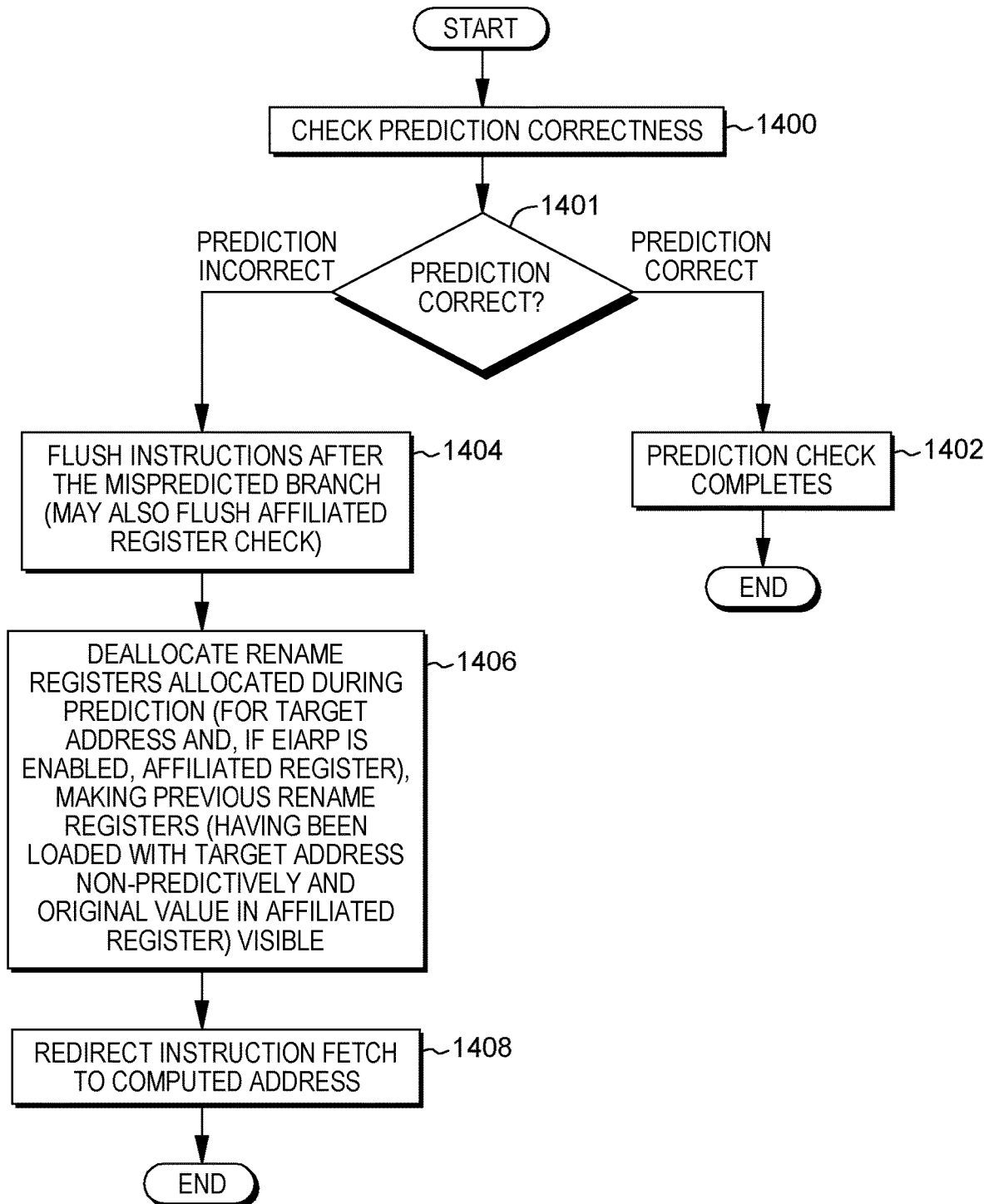
FIG. 14 depicts another example of checking prediction correctness, in accordance with an aspect of the present invention.

Referring now to FIG. 14, in this example, by definition, if there is a branch misprediction, then prediction of or relating to the affiliated value is also mispredicted. The check includes, for instance, determining the correctness of the branch prediction, STEP 1400. If the branch prediction is correct, INQUIRY 1401, then the check is complete, STEP 1402, and recovery is not performed. However, if the branch prediction is incorrect, INQUIRY 1401, then recovery is performed. For instance, the instructions after the mispredicted branch are flushed, STEP 1404. This may include flushing the affiliated register check. Further, the rename registers allocated during prediction are deallocated, making the previous rename registers visible, STEP 1406. This may include deallocating the target address register, as well as the affiliated register, if EIARP is enabled, making the previous rename registers with the non-speculative target address and the original value in the affiliated register visible. The instruction fetch is then redirected to the computed address, STEP 1408. This completes one implementation of the prediction check.

Figure 15:
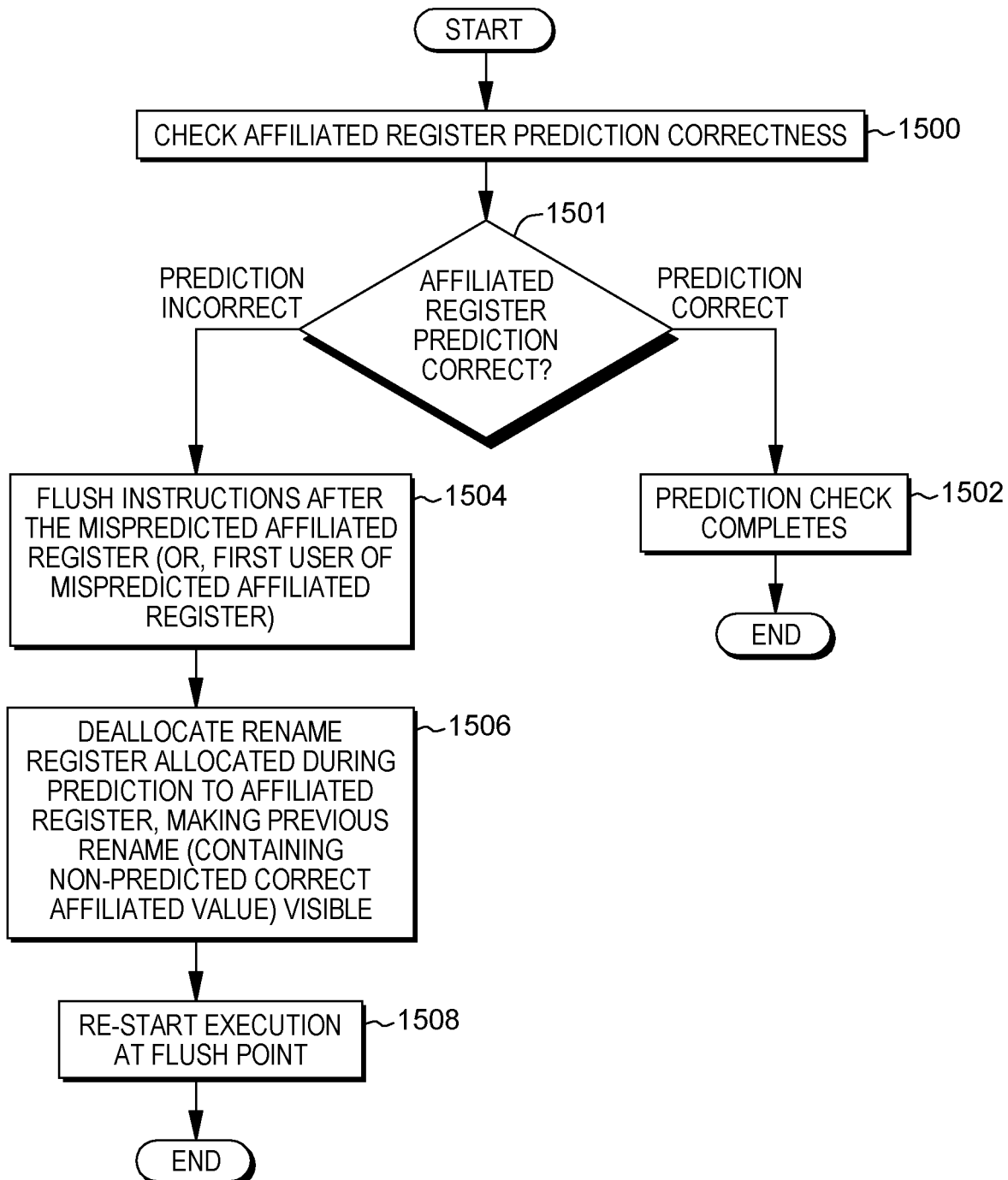
FIG. 15 depicts another example of checking prediction correctness for affiliated registers, in accordance with an aspect of the present invention.

Additionally, in one embodiment, if EIARP is enabled, a check may be invoked for correctness of the affiliated register prediction, as described with reference to FIG. 15. In one embodiment, a check is made of affiliated register prediction correctness, STEP 1500. If the prediction of the affiliated register is correct, INQUIRY 1501, then the check is complete, STEP 1502, and recovery is not performed. However, if the prediction of the affiliated register is incorrect, INQUIRY 1501, then recovery is performed. For instance, the instructions after the mispredicted affiliated register are flushed, STEP 1504. In another example, the first user of the mispredicted affiliated register is flushed at STEP 1504. Additionally, the rename register allocated during prediction for the affiliated register is deallocated, making the previous rename register that includes the non-predicted correct affiliated value visible, STEP 1506. Execution is then restarted at the flush point, STEP 1508. This completes one example of the affiliated register prediction check.

In yet a further embodiment, if a predictor is used to predict whether an affiliated value (e.g., affiliated register) may be predicted, then a predictor update associated with this prediction may also be performed, as described with reference to FIG. 16. In one example, a processor is performing this processing.

Figure 16:
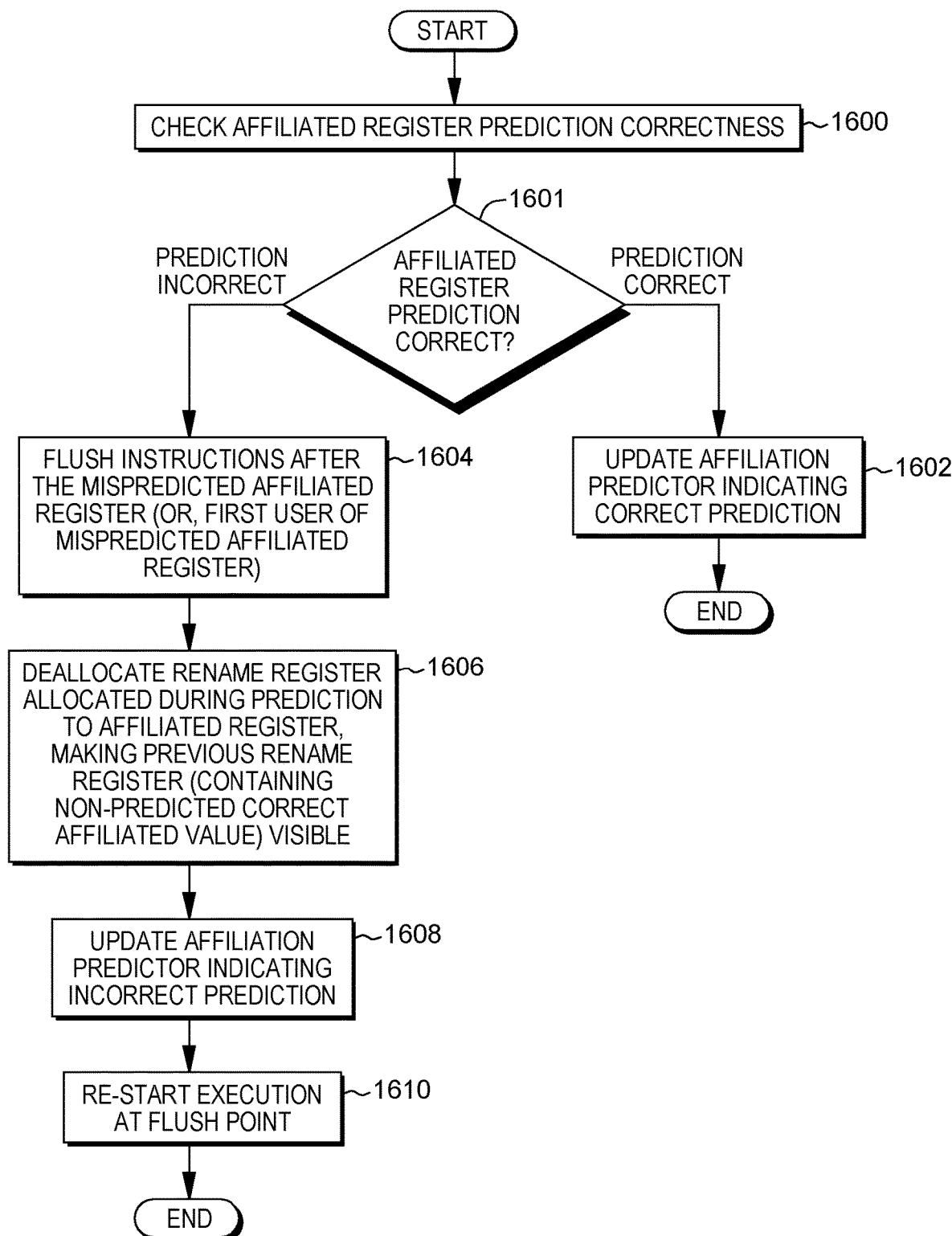
FIG. 16 depicts yet another example of checking prediction correctness for affiliated registers, in accordance with an aspect of the present invention.

Referring to FIG. 16, in one embodiment, a check is made of affiliated register prediction correctness, STEP 1600. If the prediction of whether the affiliated register may be predicted is correct, INQUIRY 1601, then the affiliation predictor may be updated to indicate a correct prediction, STEP 1602, and recovery is not performed. In another example, no update need be performed.

However, if the prediction of whether the affiliated register may be predicted is incorrect, INQUIRY 1601, then recovery is performed. For instance, the instructions after the mispredicted affiliated register are flushed, STEP 1604. In another embodiment, the first user of a mispredicted affiliated register is flushed at STEP 1604. Additionally, the rename register allocated during prediction for the affiliated register is deallocated, making the previous rename register that includes the non-predicted correct affiliated value visible, STEP 1606. Further, in one example, the affiliation predictor is updated to indicate an incorrect prediction, STEP 1608. Execution is then restarted at the flush point, STEP 1610. This completes one implementation of the prediction check.

In an alternate embodiment, the value stored in the incorrectly predicted affiliated register is copied into the rename register in lieu of deallocating the rename register. Other variations are possible.

In a further aspect, a prediction is made as to whether a register is affiliated for a specific instance and a further prediction is made as to the register number or other identification. One example of this processing is described with reference to FIG. 17. In one example, a processor is performing this processing.

Figure 17:
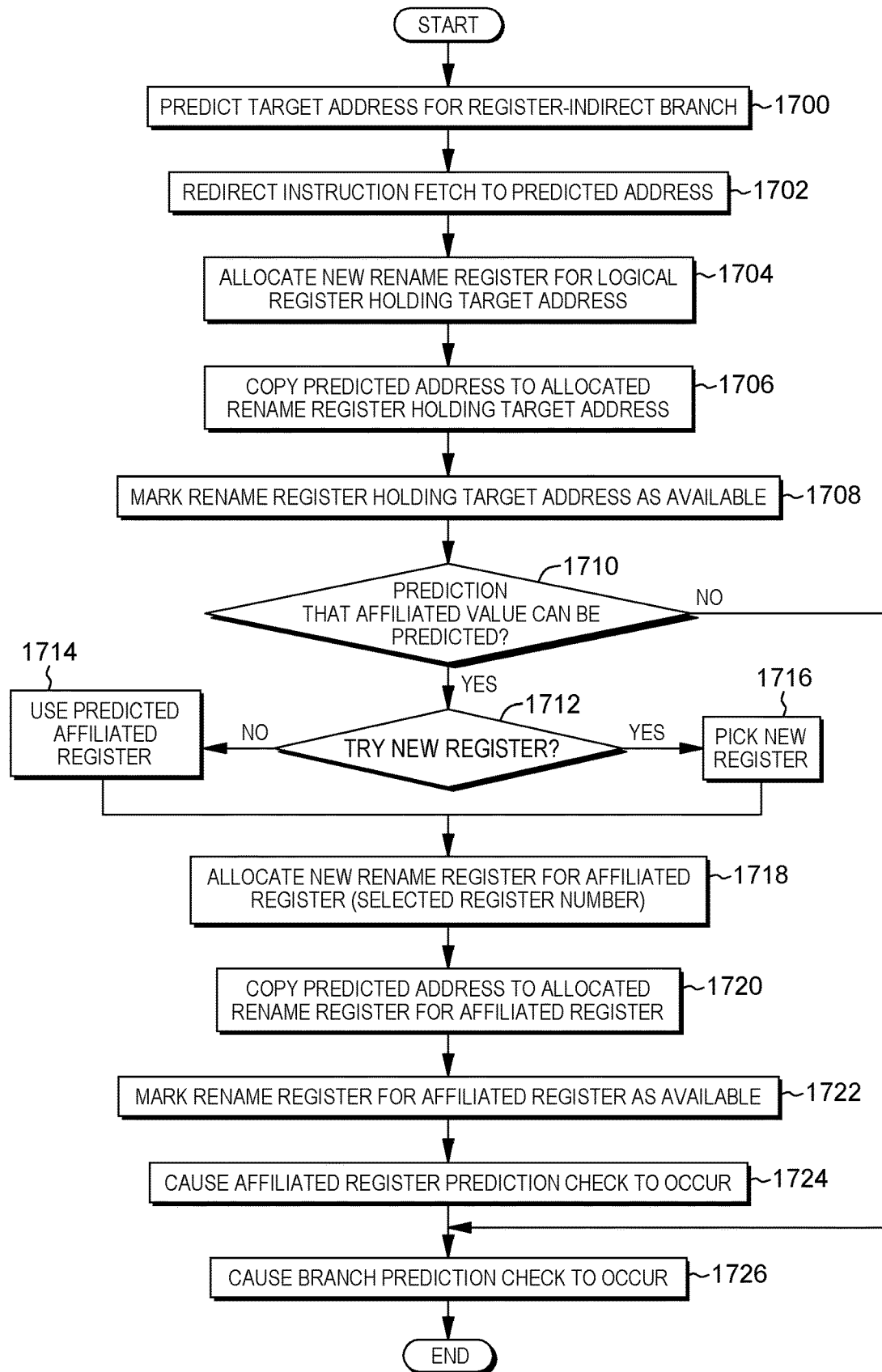
FIG. 17 depicts one example of processing associated with register-indirect branch prediction and for dynamically selecting an affiliated register that may be predicted, in accordance with an aspect of the present invention.

Referring to FIG. 17, initially, the target address for a register-indirect branch is predicted, STEP 1700, and the instruction fetch is redirected to the predicted target address, STEP 1702. Further, in one example, a new rename register is allocated for the logical register holding the target address, STEP 1704. The predicted address is copied to the allocated rename register, STEP 1706, and the rename register holding the target address is marked as available, STEP 1708.

Further, in accordance with an aspect, a determination is made as to whether the affiliated value may be predicted, INQUIRY 1710. If not, then processing continues with causing a branch prediction check to occur, STEP 1726. Otherwise, a determination is made as to whether a new register identification (e.g., number) is to be selected as the predicted affiliated register, INQUIRY 1712. If not, then an indication of a predicted affiliated register indicated by, e.g., a predictor is selected as the affiliated register, STEP 1714; otherwise, another register (e.g., other register number) is selected, STEP 1716. Thereafter, a new rename register is allocated for the selected affiliated register (e.g., having the selected register number), STEP 1718.

The predicted address is copied to the allocated rename register for the affiliated register, STEP 1720, and the rename register for the affiliated register is marked as available, STEP 1722.

A check of the prediction of the affiliated register is performed to determine whether prediction associated with the affiliated register is correct, STEP 1724, as well as a check of the branch prediction, STEP 1726, as described herein.

In at least one embodiment, INQUIRY 1712 corresponds to a test of whether a prediction confidence exceeds a threshold value. Prediction confidence can correspond, for example, to a known confidence value of 1 or more bits. The threshold may be fixed or software configured.

Figure 18:
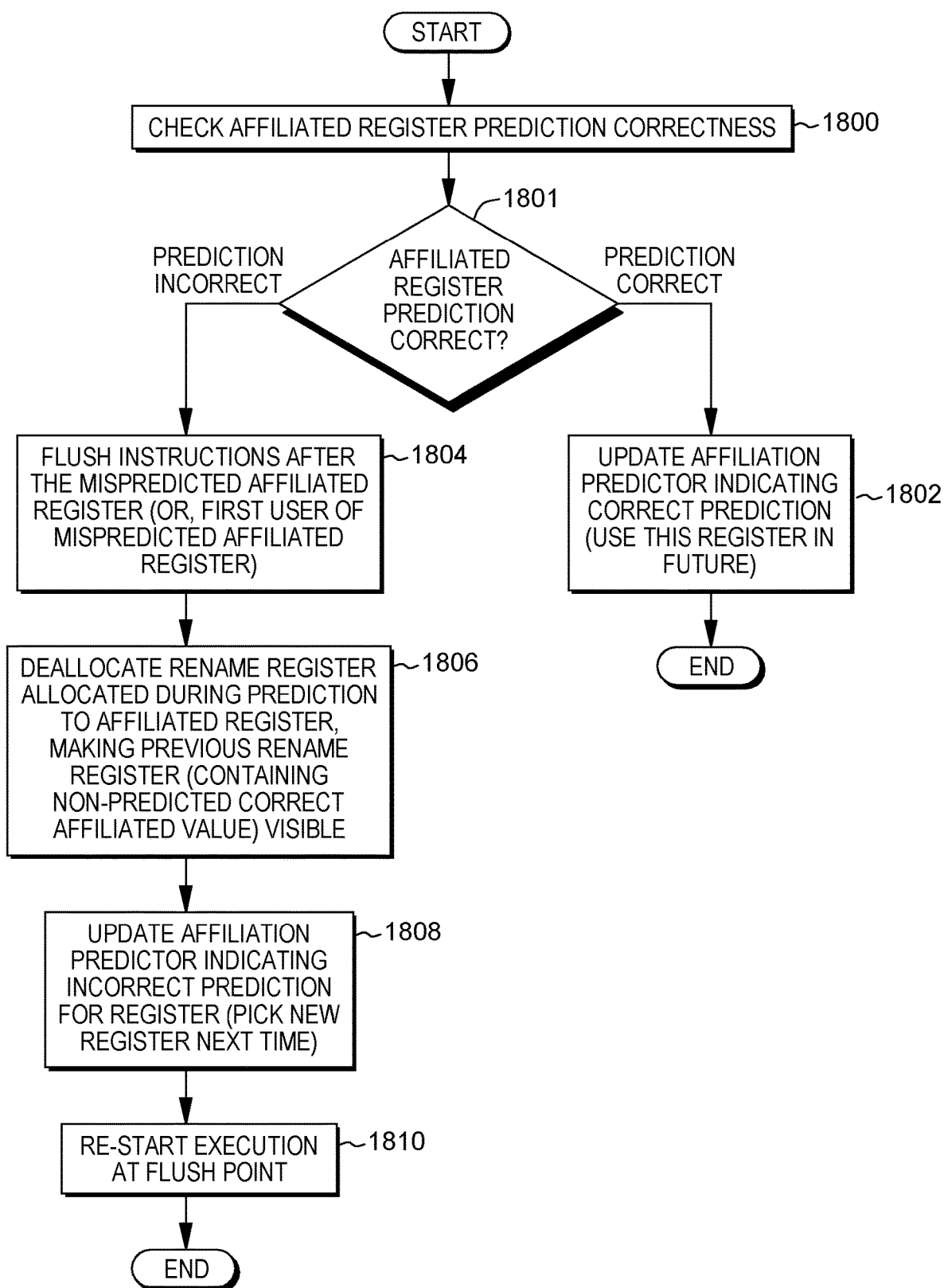
FIG. 18 depicts an example of checking prediction correctness for affiliated registers and updating a predictor, in accordance with an aspect of the present invention.

Prediction checking may also be performed to determine whether the selected affiliated register is correct, as described with reference to FIG. 18. In one example, a processor is performing this processing. In one embodiment, a check is made of affiliated register prediction correctness, STEP 1800. If the prediction of the selected affiliated register is correct, INQUIRY 1801, then the affiliation predictor may be updated to indicate a correct prediction of the register being used as the affiliated register, STEP 1802, and recovery is not performed. In another embodiment, the predictor is not updated.

However, if the prediction of the selected affiliated register is incorrect, INQUIRY 1801, then recovery is performed. For instance, the instructions after the mispredicted affiliated register are flushed, STEP 1804. In another embodiment, the first user of the mispredicted affiliated register is flushed at STEP 1804. Additionally, the rename register allocated during prediction for the affiliated register is deallocated, making the previous rename register that includes the non-predicted correct affiliated value visible, STEP 1806. Further, in one example, the affiliation predictor is updated to indicate an incorrect prediction of the specific register to be used as the affiliated register, STEP 1808. Execution is then restarted at the flush point, STEP 1810. This completes one implementation of the affiliated register prediction check.

In accordance with a further aspect, affiliated registers are recognized by recognizing a sequence of instructions. In one example, the sequence includes a first instruction adapted to create an affiliated relationship, and a second instruction adapted to perform a subroutine branch. In one example, the sequence includes:

```
mtctr   R12
bctrl
```

This sequence is recognized as performing both the affiliation-creating move and the subroutine call. In one embodiment, the affiliation-creating sequence is translated into a fusion sequence of operations that performs the move, and creates a branch with an affiliation prediction.

Based on recognizing the above sequence (or a similar sequence), a fusion sequence of operations is generated that performs the move and the branch. As examples, a simplified sequence may be generated, e.g., with R12 hardwired or with EIARP; or an enhanced fusion sequence may be generated that includes a check of the predicted branch address, obviating the cost of the MTCTR instruction altogether. One example of an enhanced sequence is described with reference to FIG. 19. In one embodiment, this processing is performed by a decoder.

Initially, a determination is made as to whether a fusion sequence opportunity has been recognized, INQUIRY 1900. For instance, has the decoder recognized MTCTR followed by BCTRL, as an example? If a fusion sequence opportunity has not been recognized, fusion generation processing is complete. Otherwise, fusion generation processing proceeds. A branch target address is predicted, STEP 1902. The target address is loaded into a program counter (PC), such that processing can begin executing at the target address, STEP 1904. Further, the predicted target address is loaded into the CTR register, STEP 1906, as well as into an affiliated register (e.g., R12), STEP 1908. Since this is a subroutine call, a return address is loaded into a link register (LR), STEP 1910. Additionally, a check of the predicted target address is performed, STEP 1912. In one example, this check is against the source of MTCTR, which is the value of R12.

In one example, the affiliated register number (e.g., R12) is hardwired as the affiliated register. In another example, the affiliated register is indicated in a control, such as in a selected control register. In yet a further example, it is dynamically determined based on the sequence of instructions (e.g., register number specified after MTCTR). Other examples are also possible. With the above sequence, there is no need to execute MTCTR, since the prediction overwrites the value, and the affiliated register and predicted target address are checked simultaneously, in one example. Other variations are possible.

Figure 19:
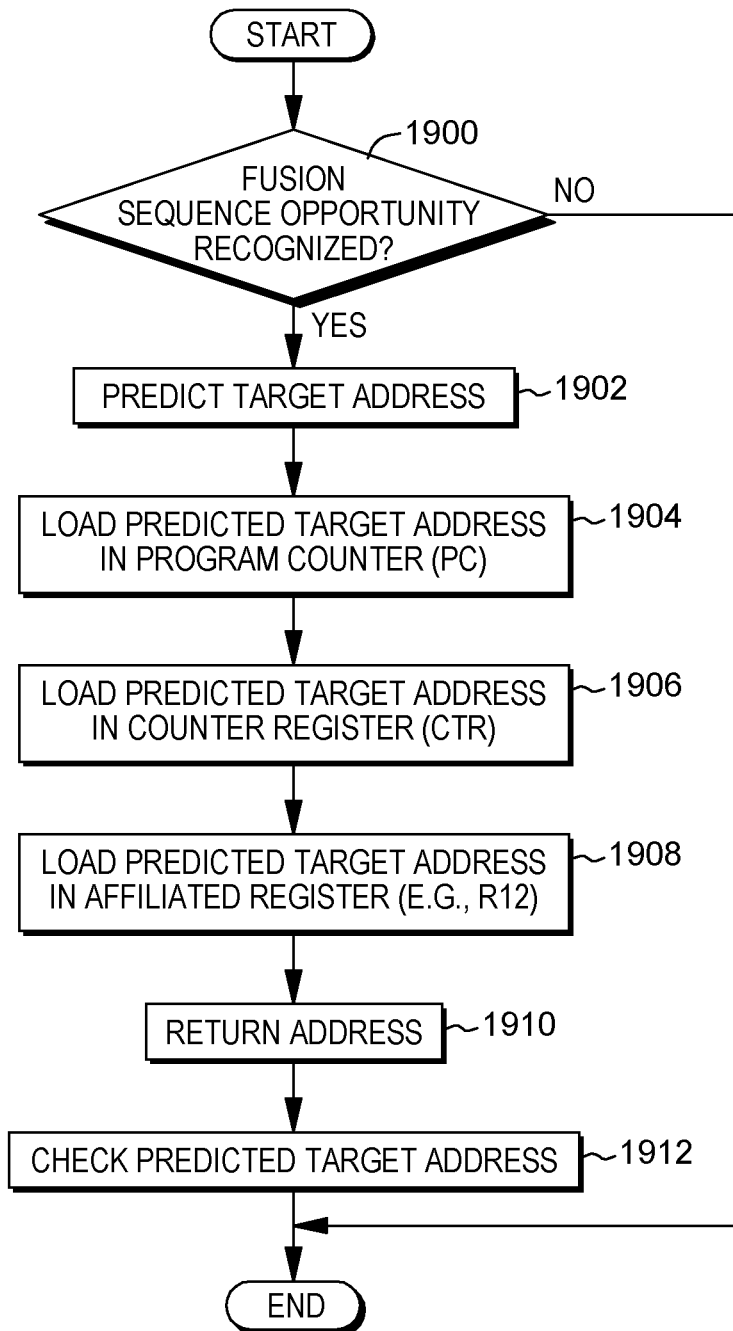
FIG. 19 depicts one example of processing associated with recognizing a fusion sequence, in accordance with an aspect of the present invention.

In one example embodiment, the operations of the technique of FIG. 19 may be expressed by generating an example iop sequence, such as:

mtctr R12
old_ctr=ctr
update_lr_from_instruction_address+
predict_indirect_ctr+
update_pc_from_prediction+
update_ctr_from_prediction+
update_affiliated_reg_from_prediction (R12)
check_target_address (old_ctr)

In another embodiment, the copy of the R12 is suppressed, and a simplified iop sequence is generated:

old_affiliated=R12+
update_lr_from_instruction_address+
predict_indirect_ctr+
update_pc_from_prediction+
update_ctr_from_prediction+
update_affiliated_reg_from_prediction (R12)
check_target_address (old_affiliated)

In a variety of embodiments, the prediction iop generates a single prediction which may be used to update the program counter (i.e., PC—the address from which instructions are fetched), the branch target register (ctr in this example), and an affiliated register (R12 in this example). In this particular embodiment, the prediction iop is also adapted to capture the PC prior to updating with the prediction in order to capture a subroutine return address, e.g., in the link register (LR). In another embodiment, the capturing of the PC in the link register (LR) may be performed by a separate iop.

In these examples, the + is used to indicate the performance of multiple operations in a single iop, the descriptive components connected by the + sign. For instance, update_pc_from_prediction updates the program counter (PC) with the address predicted by the predictor.

In one embodiment with an externally indicated affiliated register, recognition of a fusion sequence is based on recognizing a sequence including a register indicated in a configuration register. Prior to detection of a fusion-based affiliated sequence, an affiliated register is indicated using a control register for external indication of the affiliated register sequence to be recognized. One example of this processing, which is performed, e.g., by a processor, is described with reference to FIG. 20. In another embodiment, the sequence establishing the affiliated register relationship and including the affiliated register number is fixed (or "hardwired") in the processor logic, and the technique of FIG. 20 is not performed in such an embodiment.

Figure 20:
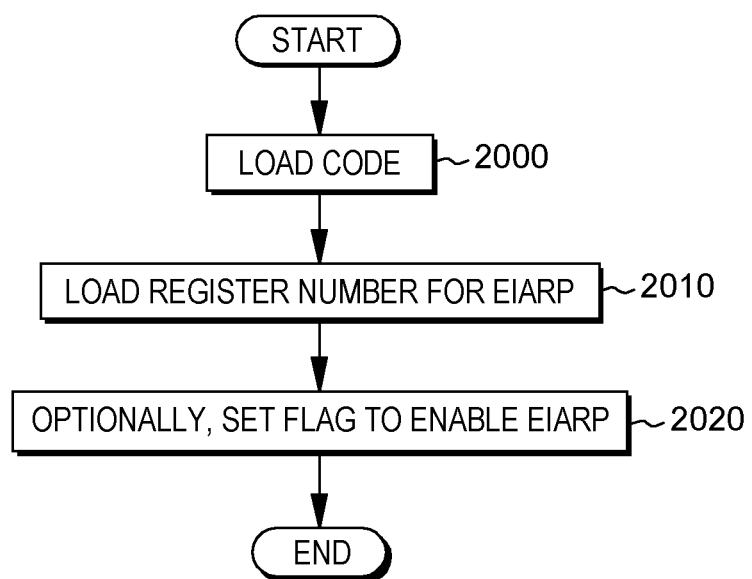
FIG. 20 depicts one example of processing associated with externally indicated affiliated register prediction and a fusion-based affiliation sequence, in accordance with an aspect of the present invention.

Referring to FIG. 20, initially, the code (such as code containing one or more fusible sequences establishing an affiliated register relationship) is loaded, STEP 2000. Further, a register number corresponding to a register which may occur in an affiliation-generating sequence to be recognized is loaded, STEP 2010. Further, optionally, a flag is set to enable EIARP, STEP 2020. Since only sequences that are recognized as establishing affiliated register relationships are translated, there is no risk of excessive mispredictions and hence a facility to enable or disable affiliated register prediction may not be present in one or more embodiments. In other embodiments, a flag for enabling or disabling the prediction of the value of an affiliated register may be provided as a safety feature, e.g., in case of an incorrect implementation of the affiliated register prediction logic. Other variations are also possible. Other variations are also possible.

If the register to be used as an affiliated register is not hardwired, but instead, indicated in a control, then the configuration information, including an indication of the affiliated register, is stored for later restoration, based on a context switch. One embodiment of this processing is described above with reference to FIG. 9. Similarly, if a hardware exception is taken, processing is performed, as described with reference to FIGS. 10-11. However, if the register number is hardwired, this processing is optional.

One embodiment of branch prediction with a fusion-based affiliated sequence is described with reference to FIG. 21. In one example, a processor is performing this processing.

Figure 21:
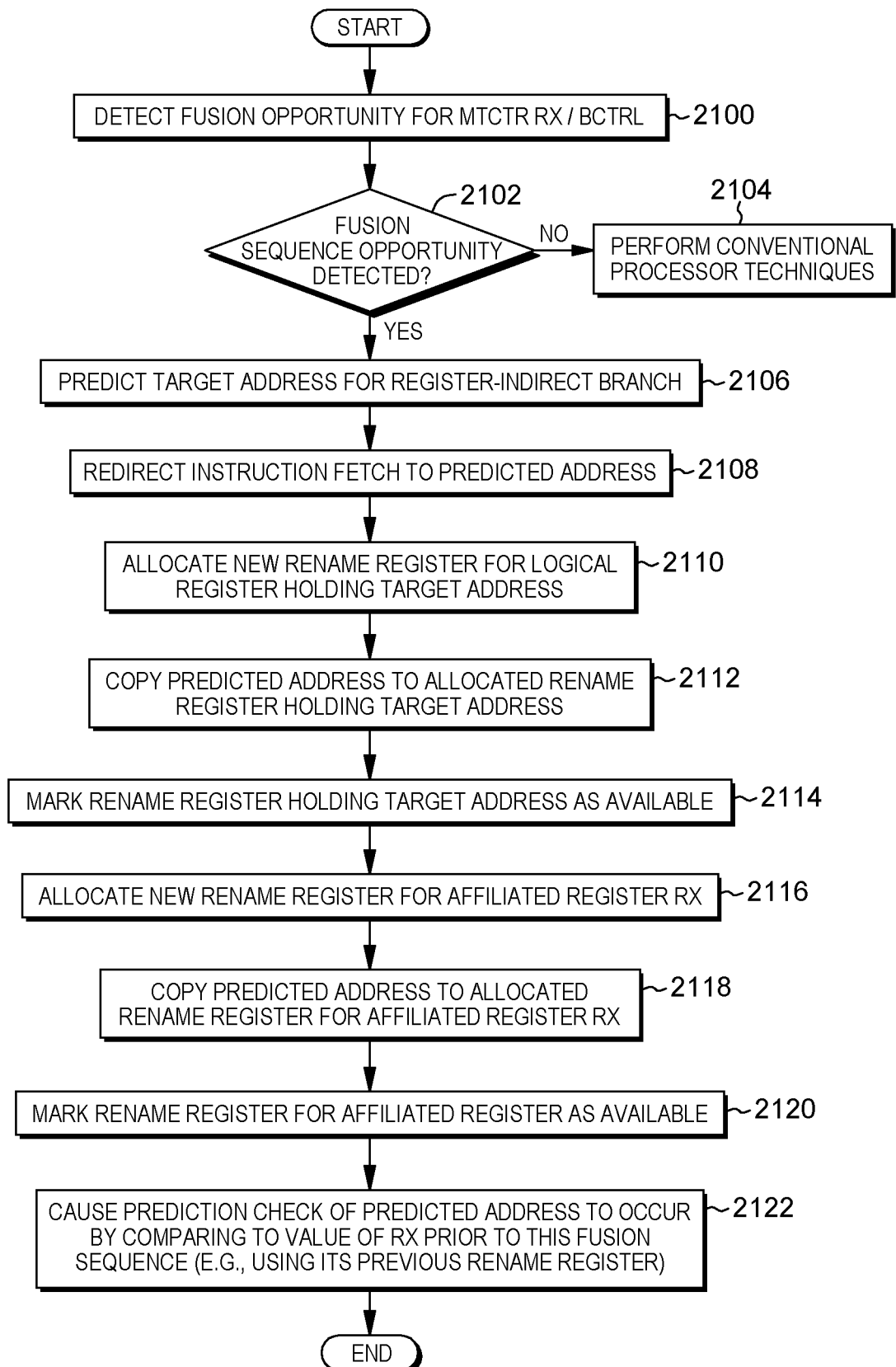
FIG. 21 depicts one example of processing associated with performing branch prediction with a fusion-based affiliated sequence, in accordance with an aspect of the present invention.

Referring to FIG. 21, a fusion opportunity detection step is performed, STEP 2100. For instance, a check is made by the decoder for a sequence of MTCTR Rx/BCTRL, where Rx corresponds to a register for which an affiliation relationship with the branch target address may be detected. In one example sequence, register Rx may correspond to register R12. Based on performing a detection step for an affiliation-creating sequence which may be fused, a determination is made as to whether such a fusion sequence opportunity is detected, INQUIRY 2102. That is, is a sequence of MTCTR Rx and BCTRL present in the code stream, and does Rx of MTCTR match an expected register number, such as a hardwired affiliated register number, or a number provided in a control, e.g., EIARP control, as examples? If a fusion sequence opportunity is not detected, conventional processing is performed, STEP 2104. Otherwise, processing continues with predicting the target address for a register-indirect branch, STEP 2106, and redirecting the instruction fetch to the predicted target address, STEP 2108. Further, in one example, a new rename register is allocated for the logical register holding the target address, STEP 2110. The predicted address is copied to the allocated rename register, STEP 2112, and the rename register holding the target address is marked as available, STEP 2114.

Additionally, a new rename register is allocated for the affiliated register (e.g., the register Rx specified in the affiliation-creating fusion sequence), STEP 2116. The predicted address is copied to the rename register allocated for the affiliated register, STEP 2118, and the rename register for the affiliated register is marked as available, STEP 2120.

A check of the prediction of the predicted address is performed to determine whether the prediction is correct, STEP 2122. This includes, for instance, comparing the target address to a value of the affiliated register (Rx) prior to the fusion sequence (e.g., using its previous rename register). If the prediction is incorrect, then recovery is performed, as described herein. One example of such recovery is described with reference to FIG. 14.

In further embodiments, the affiliated register number is determined by the sequence itself (e.g., register number specified after MTCTR), rather than hardwired or provided by a control (i.e., EIARP). In one such example embodiment, INQUIRY 2102 checks whether there is a sequence of MTCTR RX and BCTRL present in the code stream. If the sequence is present, then the particular register RX specified in the sequence is used as the affiliated register. In one such embodiment, the code loading and EIARP configuration technique, such as that of FIG. 8 or FIG. 20, are not necessary, and affiliated register prediction may operate in conjunction with conventional code loading techniques. Further, saving the affiliated register information on a context switch and/or performing hardware exception processing is not needed, and affiliated register prediction may operate in conjunction with conventional context switch sequences and hardware exception processing, in at least one embodiment.

In the above example of a sequence of instructions, the MTCTR and BCTRL instructions are in sequential order. However, in accordance with a further aspect, affiliation is predicted even if the instructions are not in sequential order. For instance, assume the following code:

```
mtctr    R12
<instructions...>
bctrl
```

The above code is recognized as performing both the affiliation-creating move and the subroutine call. Thus, based on recognizing an instruction that creates an affiliation (e.g., MTCTR), an indicator is set. The indicator may further specify the number (or other indication) of the affiliated register. Then, when an operation destroying the affiliation is recognized (e.g., either changing the contents of CTR, or the register that was the source of MTCTR), the indicator is reset. When a BCTRL is encountered, it is indicated as a branch with an affiliated register if an affiliation indication is active, further optionally indicating the register number being affiliated.

Figure 22:
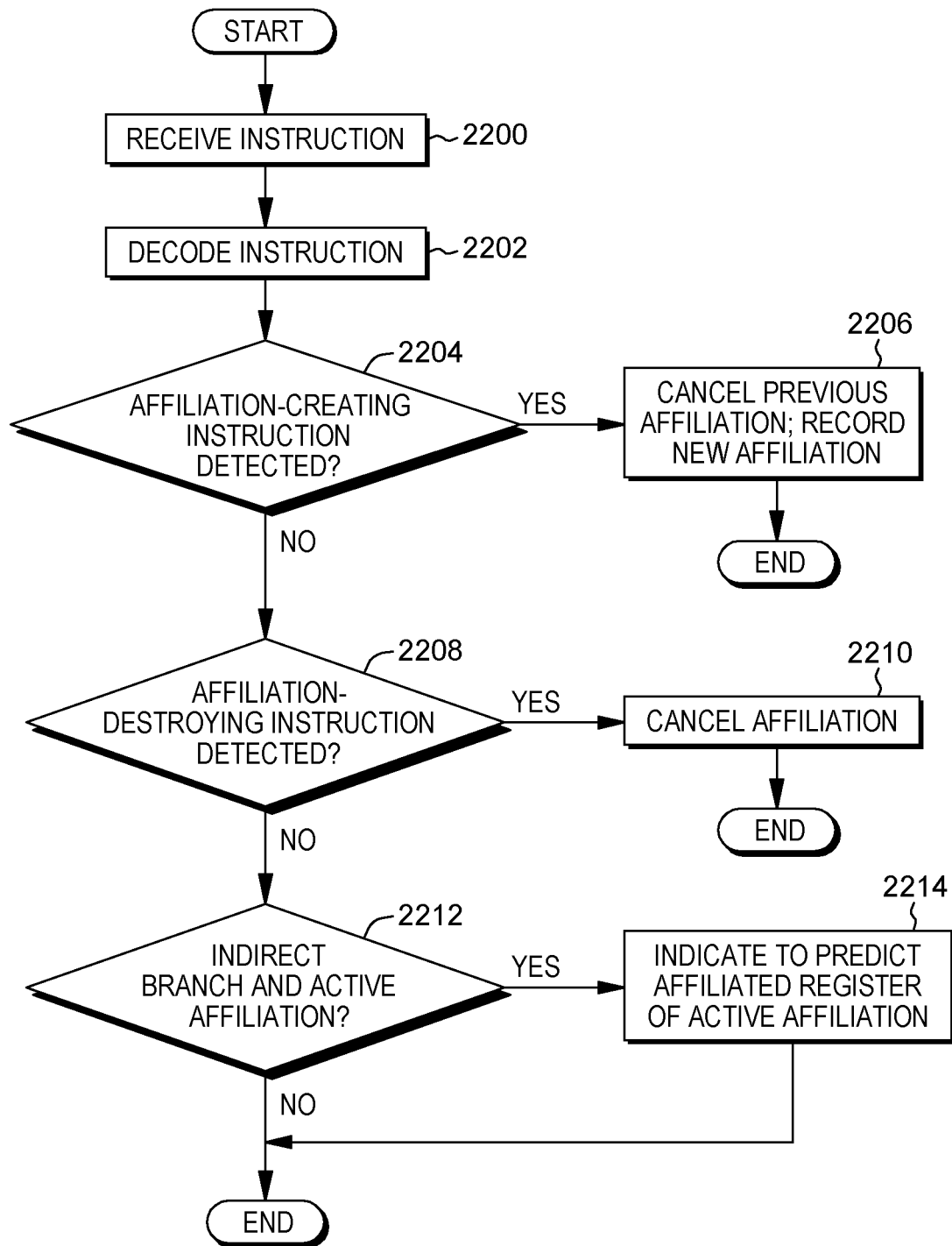
FIG. 22 depicts one example of processing associated with determining whether an instruction is affiliation creating or destroying, in accordance with an aspect of the present invention.

One embodiment of processing associated with determining affiliation based on dynamic runtime control analysis is described with reference to FIG. 22. In one example, a processor is performing this processing. The technique of FIG. 22 is performed on each instruction of the instruction stream sequence to identify affiliation of a register to a branch target register of a branch, identify branches for which an affiliated register should be predicted, as well as the register number of the affiliated register. Detected affiliation relationships are passed from the execution of the technique of FIG. 22 for one instruction to the execution of this technique for the next instruction, until an affiliation is either cancelled, or a register-indirect branch is detected in conjunction with which the prediction of the value of an affiliated register is to be performed. This processing is performed by the instruction decoder, in one example.

Referring to FIG. 22, in one embodiment, an instruction is received, STEP 2200, and decoded, STEP 2202. A determination is made as to whether the instruction is an affiliation-creating instruction, such as an MTCTR, INQUIRY 2204. If it is an affiliation-creating instruction, any previous affiliation is cancelled, and the new affiliation is recorded (e.g., an indicator is set), STEP 2206. However, if the instruction is not an affiliation creating instruction, then a further determination is made as to whether the instruction is an affiliation-destroying instruction (e.g., an instruction that overwrites either the source or the target of the affiliation relationship, e.g., either the source register of MTCTR which established the affiliation, or the count register, CTR, respectively), INQUIRY 2208. If it is an affiliation destroying instruction, then the affiliation is cancelled (e.g., the indicator is reset), STEP 2210.

If the instruction is not an affiliation-creating or an affiliation-destroying instruction, then this processing continues with INQUIRY 2212, which tests whether the present instruction is a register-indirect branch instruction, and an affiliation is currently active. If INQUIRY 2212 is positive, then a register-indirect branch instruction with an affiliated register has been detected, and control passes to STEP 2214. Otherwise, the technique ends, for the present instruction.

At STEP 2214, a register-indirect branch instruction has been detected when an affiliation relationship between a register-indirect branch target register (such as the counter register, ctr) and another register is active. In order to facilitate the prediction of the value of the detected affiliated register, the presence of an affiliated register is indicted in conjunction with the branch instruction, and the register number of the affiliated register is recorded, so as to facilitate the prediction of the value of the affiliated register in conjunction with branch processing for the present branch. The technique of FIG. 22 terminates for the present instruction.

When the technique of FIG. 22 completes for one instruction being processed for a processor (e.g., after STEPS 2206, 2210, 2212 or 2214), the processing is performed on the next fetched instruction. The recorded affiliation information is passed from one execution of the technique of FIG. 22 to the next execution for the next instruction in the instruction stream.

Based on determining the sequence of an affiliation-creating move and a subsequent branch in accordance with STEP 2214, even though they may be separated by one or more other instructions, a fusion sequence is generated, based on the affiliation-creating move and the branch, as described above. As an example, the processing of FIG. 19, as well as FIGS. 20-21, may be performed, in addition to recovery, as described with reference to FIG. 14. Other processing described with fusion and/or predictive branching may also be performed in one or more embodiments.

As described herein, in one embodiment, to avoid the cost of performing a move from counter instruction, MFCTR, (which moves the value from CTR to a selected register (e.g., R12)), when the CTR value is predicted, an ABI may specify the presence of the value of the CTR in a general register (e.g., register R12, in accordance with the known ELFv2 ABI of the Power Architecture), and, the predicted value is written into CTR and the selected register (e.g., R12) by a processor, when a sequence corresponding to the ABI function call sequence using an affiliated register (such as R12) to transfer the called function's address to the called function is detected in accordance with an aspect of the present invention.

This selected register is referred to herein as an affiliated register. In one example, the value of the selected register is used to determine another value, such as a pointer to a table of contents (TOC) or a global offset table (GOT), in accordance with commonly known ABI specifications, such as the ELF v2 ABI of the Power Architecture. This other value is stored in another selected register, such as R2. For instance, the value of the other selected register, R2, is obtained by adding an offset to the value in the selected register (e.g., R12). The value of the other selected register (e.g., R2) is then used, for instance, as a pointer to the TOC or GOT, which provides access to variables. In particular, a compiler generates object code from source code, without knowing the final address or displacement of the code/data. Specifically, the compiler generates object code that will access a variable address reference data structure (e.g., a Global Offset Table or a Table of Contents (TOC)) for variable values without knowing the final size of the data structure or offsets/addresses of various data sections. Placeholders for this information are left in the object code and updated by a linker.

Since the value of the affiliated register (e.g., R12) is being predicted and the offset is known or determinable, in accordance with an aspect, the value of the other selected register is predicted as an affiliated derived value.

In one implementation, the configuration and processing of the affiliated derived value is similar to the configuration and processing of the affiliated value. For instance, an indication of the affiliated derived value (e.g., register number, such as R2) may be hardwired or stored in a control register or other control field, such as an MSR, SPR, PSW, PTE, STE, etc. Further, if the code is a candidate for EIARP, then the register number of the affiliated derived register may be loaded (e.g., STEP 806 of FIG. 8). As further examples, the value may be stored and restored in a context switch, as described in one example with reference to FIG. 9, and be included in exception processing, as described in one example with reference to FIGS. 10-11. It may also be included in other affiliated register and/or register-indirect branch prediction processing, described herein.

Figure 23:
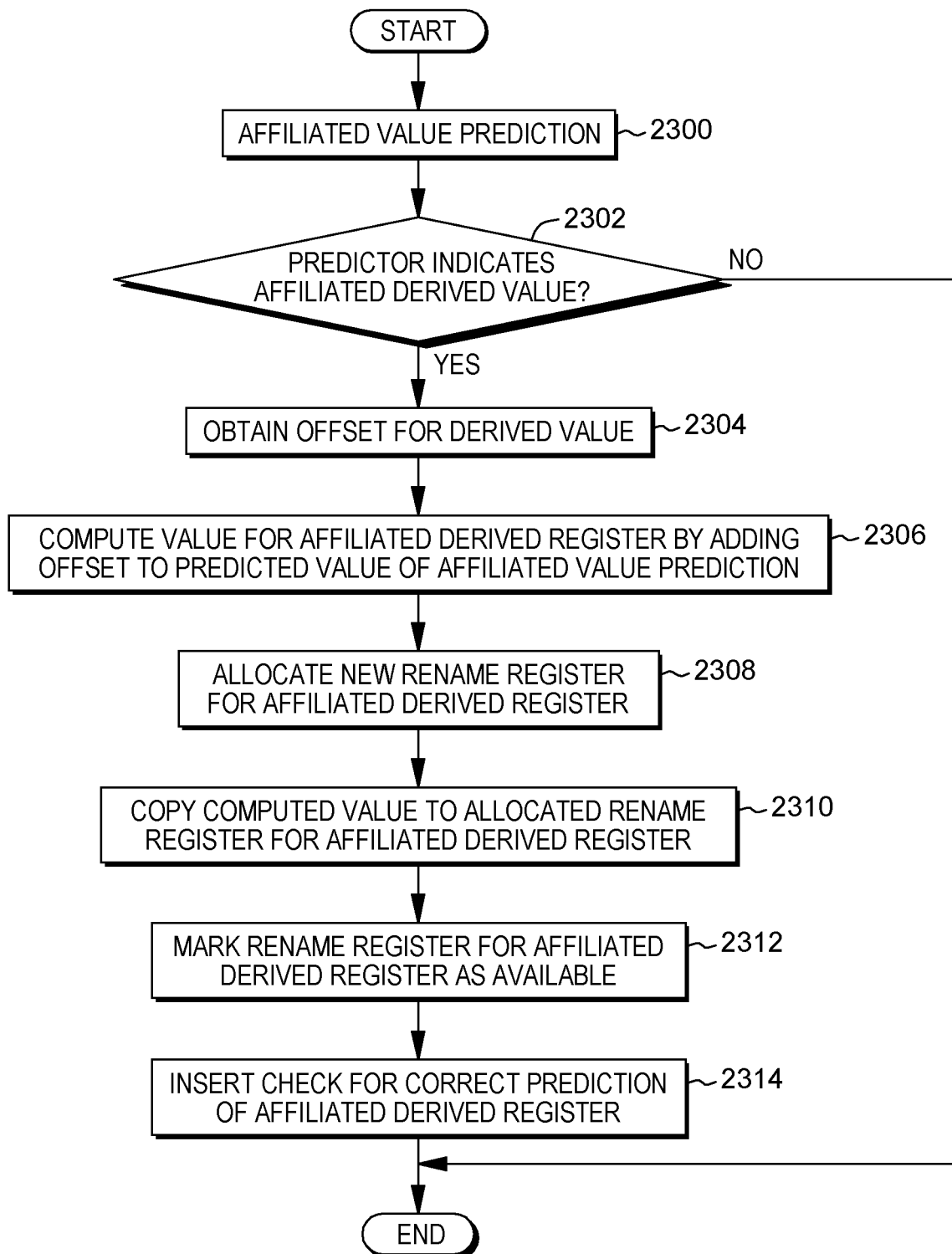
FIG. 23 depicts one example of processing associated with predicting affiliated derived registers, in accordance with an aspect of the present invention.

One example of a prediction technique for a register-indirect branch that also predicts an affiliated derived register is described with reference to FIG. 23. In one example, a processor is performing this processing. Initially, processing associated with a register-indirect branch and affiliated value prediction is performed, STEP 2300. This may include a number of operations, including, for instance: predicting the target address for a register-indirect branch; redirecting the instruction fetch to the predicted target address; allocating a new rename register for the logical register holding the target address; copying the predicted address to the allocated rename register; marking the rename register holding the target address as available; allocating a new rename register for the affiliated register; copying the predicted address to the rename register allocated for the affiliated register; marking the rename register for the affiliated register as available; and performing one or more prediction checks, as described, in one example, with reference to FIG. 5.

In addition to the above processing, in which one or more of the above operations are performed, a determination is made as to whether the predictor predicts an affiliated derived register, INQUIRY 2302. In one example, this is based on recognizing a sequence of instructions that represents use of a GOT. In a further example, one or more controls in a control register may be used to predict whether the value of a derived affiliated register to be predicted. Other examples are also possible.

If the predictor does not predict an affiliated derived register, then this processing is complete. In one example, when the code branches to a sequence computing a derived value, dynamic idiom recognition is performed during execution. A sequence computing a derived value is recognized, e.g., dynamically during the execution of the code, and a predictor is updated to indicate such.

Otherwise, if the predictor does predict an affiliated derived value, in one example, an offset for the derived value is obtained, STEP 2304. This offset may be obtained using a variety of techniques, including using a look-up table, accessing the instruction stream or using a predictor, as examples. Many techniques are possible. Further, a value for the affiliated derived register is computed by, for instance, adding the offset to a predicted value of the affiliated register obtained in STEP 2300, STEP 2306.

A new rename register is allocated for the affiliated derived register, STEP 2308. The computed value is copied to the allocated rename register for the affiliated derived register, STEP 2310, and the rename register for the affiliated derived register is marked as available, STEP 2312.

A check of the prediction of the affiliated derived register may be performed to determine whether the prediction is correct, STEP 2314. Further details associated with a prediction check that includes checking the prediction of the affiliated derived register are described with reference to FIG. 24. This may be performed in addition to the branch prediction check and/or the affiliated register prediction checks, as examples. In one example, a processor is performing this processing.

Figure 24:
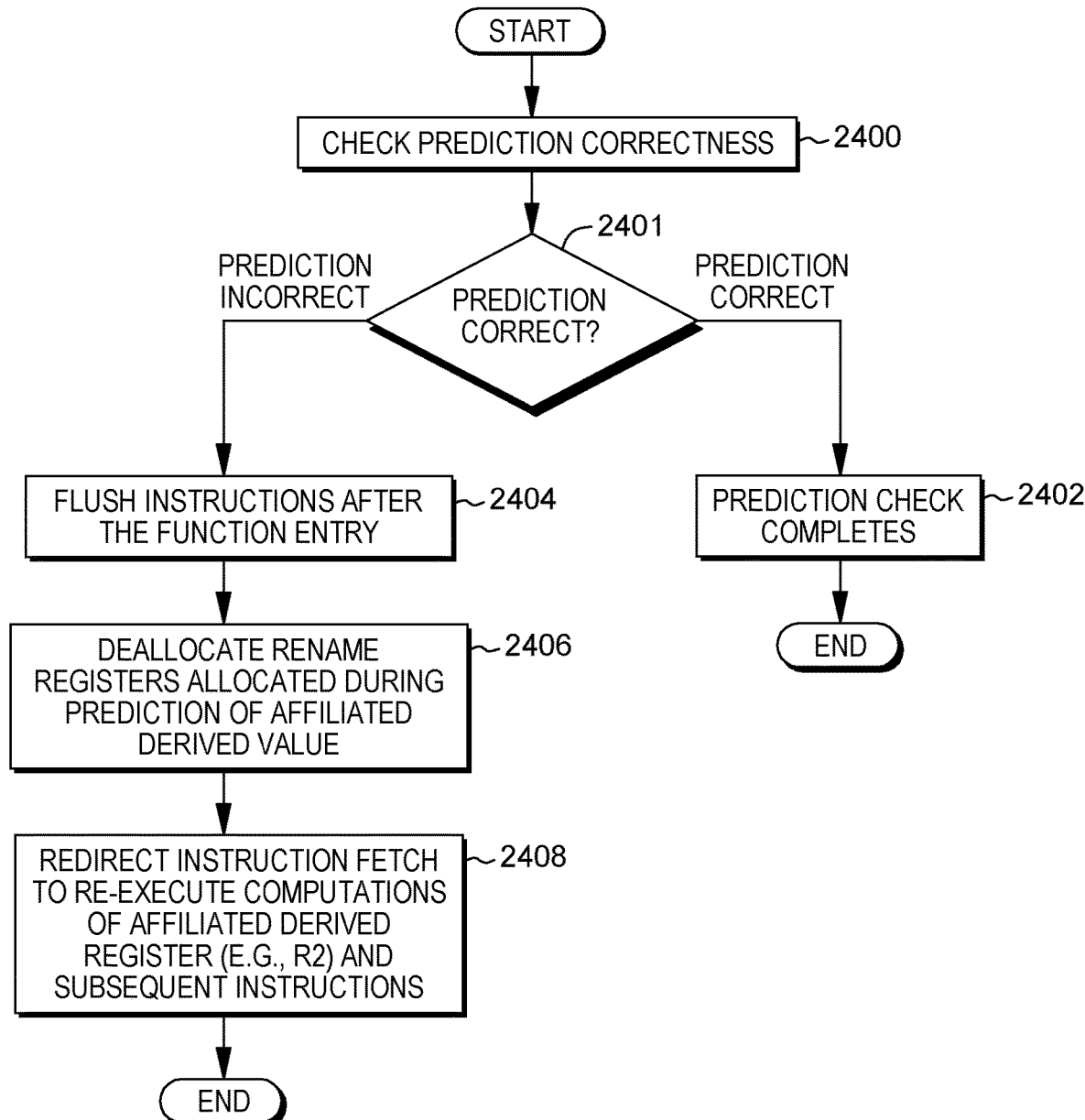
FIG. 24 depicts one example of checking prediction correctness for affiliated derived registers, in accordance with an aspect of the present invention.

Referring to FIG. 24, in one example, a check is made of the correctness of the affiliated derived prediction, STEP 2400. If the prediction is correct, INQUIRY 2401, then the check is complete, STEP 2402, and recovery is not performed. However, if the prediction is incorrect, INQUIRY 2401, then recovery is performed. For instance, the instructions after the function entry are flushed, STEP 2404. Further, the rename registers allocated during prediction are deallocated, including the rename register for the affiliated derived value, STEP 2406. Additionally, the instruction fetch is then redirected to re-execute the computations of the affiliated derived register (e.g., R2) and subsequent instructions, STEP 2408. This completes one implementation of the prediction check.

In other implementations, the indication of the affiliated derived register (e.g., register number) may be predicted. Thus, processing is performed, as described herein, for the affiliated register, to predict the indication, use the prediction, check the correctness, e.g., by comparing the predicted value of the affiliated derived register with the value computed by the instruction sequence computing the value non-predictively in the instruction stream and/or recover therefrom. Many variations are possible.

In a further aspect, the presence of an affiliated derived register and the particular register number of the register may be determined responsive to detecting one or more sequences of instructions. For instance, the decode logic recognizes the following code sequence:

```
mtctr   Rx
bctrl
addis Ry, Rx, #higha (__foo - .TOC.)
addi Ry, Ry, #low (__foo - .TOC.)
```

In the above code, addis is add immediate shift, e.g., in accordance with the definition of the Power Architecture in one example embodiment; addi is add immediate, e.g., in accordance with the definition of the Power Architecture in one example embodiment; Rx is the affiliated register (e.g., R12); and Ry is the affiliated derived register (e.g., R2).

Based on recognizing the above sequence (or a similar sequence; different sequences are possible and a hardware implementation may recognize one or more of the possible sequences, in accordance with a variety of example embodiments), a fusion sequence is generated that performs the move, branch and computing the derived value. As examples, a simplified fusion sequence may be generated, e.g., with the affiliated register (e.g., R12) and the affiliated derived register (e.g., R2) hardwired or specified in a control register; or an enhanced fusion sequence may be generated that includes a check of the predicted branch address against the original affiliated register, obviating the cost of the MTCTR altogether. In one embodiment, this processing is performed by a decoder and includes, for instance:

predict target address
    PC<=predicted target address
    CTR<=predicted target address
    Rx<=predicted target address
    Ry<=predicted target address+offset
    return address
    check predicted target address against Rx In one example, the affiliated register number (e.g., R12) and/or the affiliated derived register number (e.g., R2) are hardwired as the affiliated register and the affiliated derived register, respectively. In another example, the affiliated register and/or the affiliated derived register number is indicated in a control, such as in a selected control register. In yet a further example, they are dynamically determined based on the sequence of instructions (e.g., register number specified after MTCTR or the register number provided in the addis or addi). Other examples are also possible.

Figure 25:
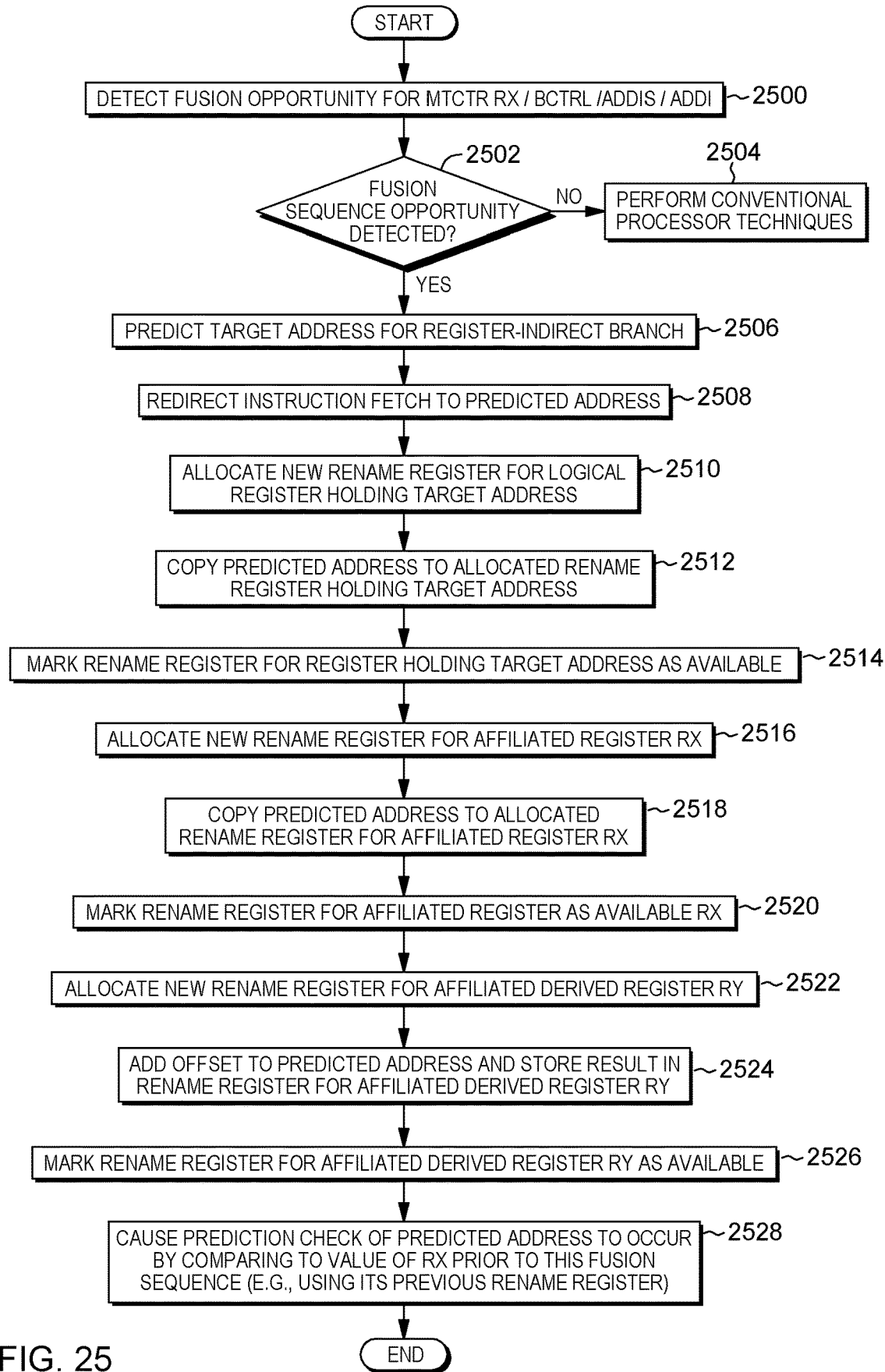
FIG. 25 depicts one example of processing associated with branch prediction and fusion-based affiliated derived sequences, in accordance with an aspect of the present invention.

Further details regarding a prediction technique for a register-indirect branch with a fusion-based affiliated derived sequence are described with reference to FIG. 25. In one example, a processor is performing this processing. In one embodiment, a fusion opportunity detection step is performed, STEP 2500. For instance, a check is made by the decoder for a sequence of MTCTR Rx/BCTRL./ADDIS/ADDI. Based on performing the detecting step, a determination is made as to whether such a fusion sequence opportunity is detected, INQUIRY 2502. That is, is a sequence of MTCTR, BCTRL, ADDIS and ADDI present in the code stream, and does Rx of MTCTR match an expected register number, such as a hardwired affiliated register number, or a number provided in a control, as examples? If a fusion sequence opportunity is not detected, conventional processing is performed, STEP 2504. Otherwise, processing continues, in one example, with predicting the target address for a register-indirect branch, STEP 2506, and redirecting the instruction fetch to the predicted target address, STEP 2508. Further, in one example, a new rename register is allocated for the logical register holding the target address, STEP 2510. The predicted address is copied to the allocated rename register, STEP 2512, and the rename register holding the target address is marked as available, STEP 2514.

Further, a new rename register is also allocated for the affiliated register (e.g., Rx, such as R12), STEP 2516. The predicted address is copied to the rename register allocated for the affiliated register, STEP 2518, and the rename register for the affiliated register is marked as available, STEP 2520.

Additionally, a new rename register is also allocated for the affiliated derived register (e.g., Ry, such as R2), STEP 2522. An offset is added to the predicted address and the result is stored in the rename register allocated for the affiliated derived register, STEP 2524. The rename register for the affiliated derived register is marked as available, STEP 2526.

A check of the prediction of the predicted address is performed to determine whether the prediction is correct, STEP 2528. This includes, for instance, comparing the target address to a value of the affiliated register (Rx) prior to the fusion sequence (e.g., using its previous rename register). If the prediction is incorrect, then recovery is performed, as described herein, in one example. This completes one embodiment of this processing.

In other embodiments, other prediction checks may also be performed, as described herein.

One or more aspects of the present invention are inextricably tied to computer technology and facilitate processing within a computer, improving performance thereof. Further details of one embodiment of facilitating processing within a computing environment, as it relates to one or more aspects of the present invention, are described with reference to FIGS. 26A-26B.

Figure 26A:
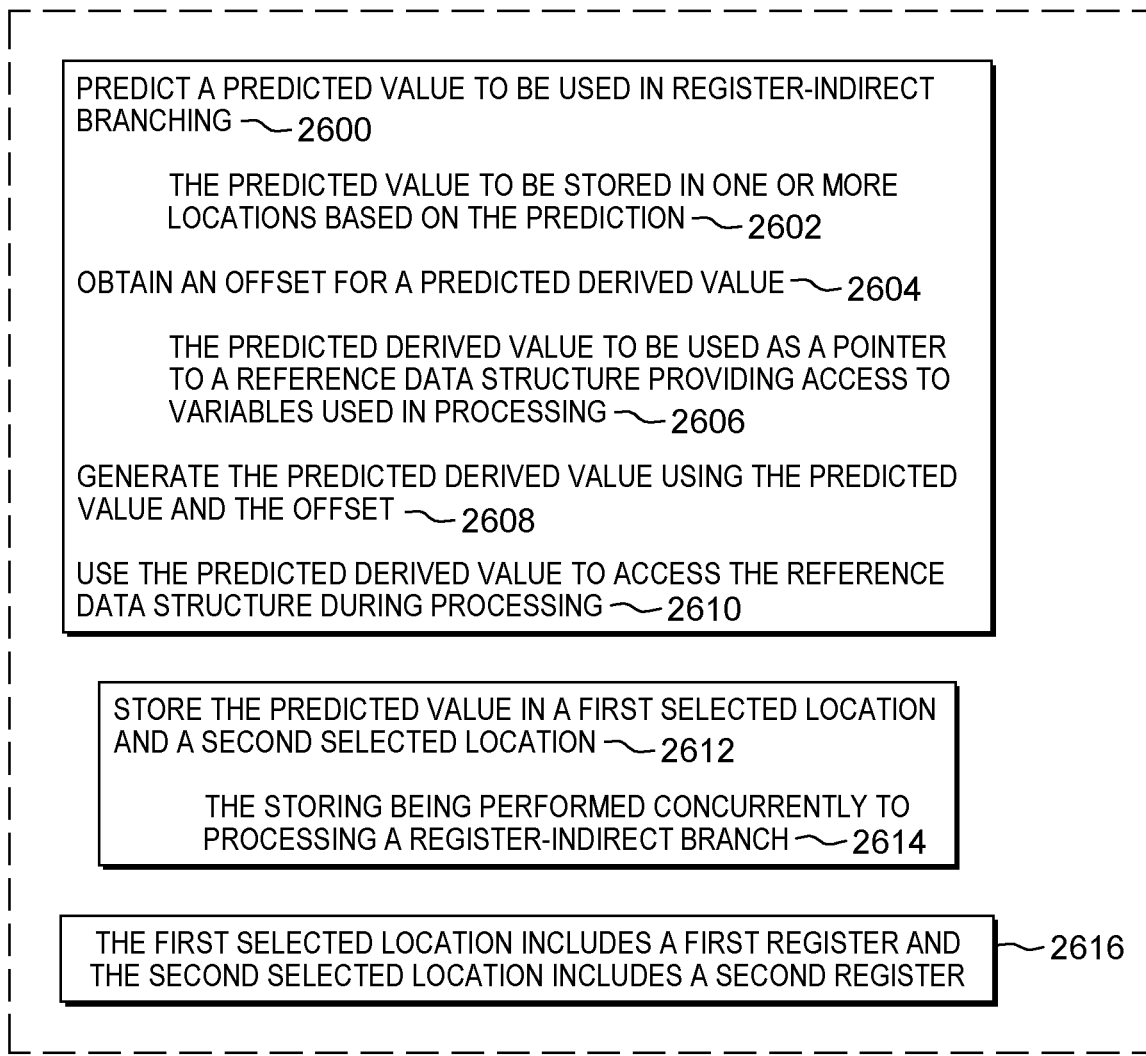
FIGS. 26A-26B depict one embodiment of facilitating processing within a computing environment, in accordance with an aspect of the present invention.

Referring to FIG. 26A, in one embodiment, a predicted value to be used in register-indirect branching is predicted (2600). The predicted value is to be stored in one or more locations based on the prediction (2602). An offset for a predicted derived value is obtained (2604). The predicted derived value is to be used as a pointer to a reference data structure providing access to variables used in processing (2606). The predicted derived value is generated using the predicted value and the offset (2608), and is used to access the reference data structure during processing (2610).

In one embodiment, the predicted value is stored in a first selected location and a second selected location (2612), and the storing is performed concurrently to processing a register-indirect branch (2614). The first selected location includes, for instance, a first register and the second selected location includes, for instance, a second register (2616).

Figure 26B:
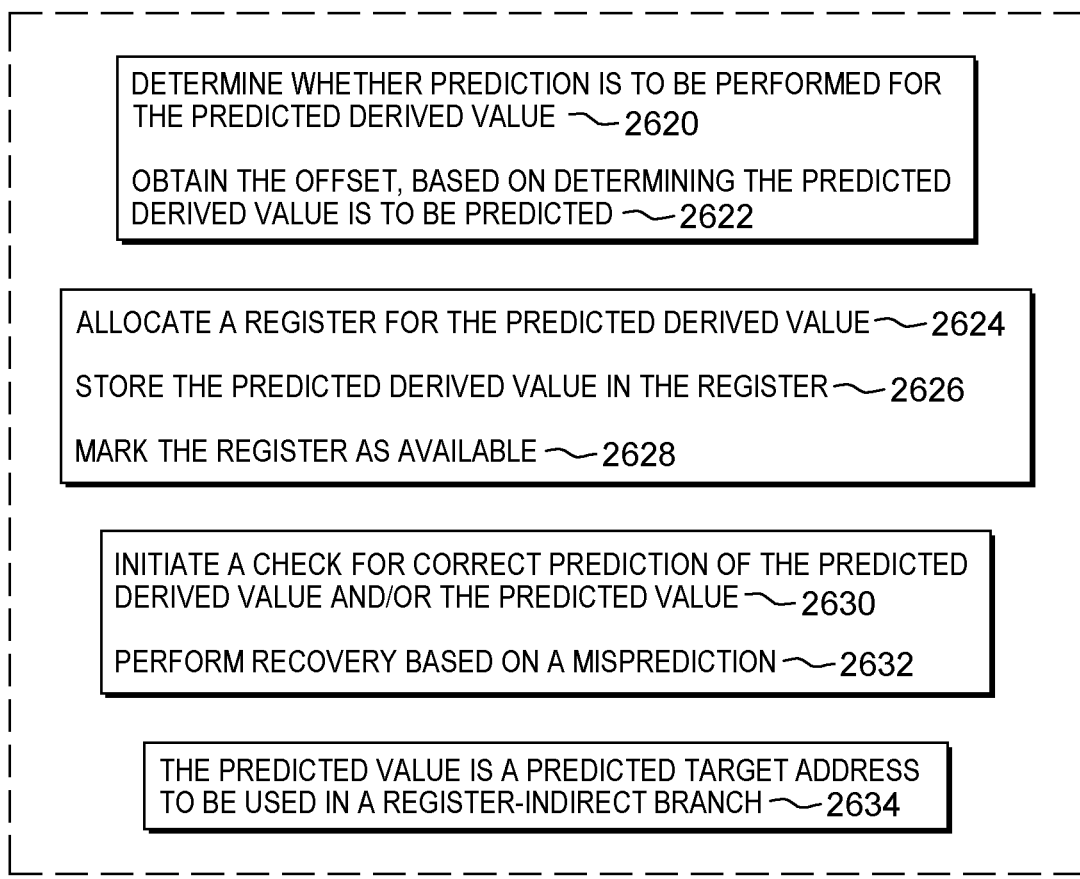

In a further embodiment, referring to FIG. 26B, a determination is made as to whether prediction is to be performed for the predicted derived value (2620). Based on determining the predicted derived value is to be predicted, the offset is obtained (2622).

Further, in one embodiment, a register for the predicted derived value is allocated (2624), and the predicted derived value is stored in the register (2626). The register is marked as available (2628).

In one embodiment, a check for correct prediction of the predicted derived value and/or the predicted value may be initiated (2630), and recovery may be performed based on a misprediction (2632).

As an example, the predicted value is a predicted target address to be used in a register-indirect branch (2634).

One or more aspects of the present invention are advantageously used to accelerate instruction sequences. In accordance with one embodiment for the Power architecture, the sequence provided below can be executed efficiently, in which the counter register is used to initialize a GOT base when the function is entered via a counter-indirect branch.

Thus, a caller may call a subroutine, as indicated below, when performing a register indirect or a module external call, and when the counter (CTR) register has been initialized with the target register of the function to be called:
    bctrl In accordance with one embodiment, an ABI defines a function to have two entry points, one for count register (ctr)-indirect calls from module external callers and register-indirect calls when a GOT pointer is to be initialized, and from a local caller when a GOT pointer is not to be initialized:

```
callee_ctr_indirect_entry:
    mfctr r12                ! obtain CTR value
    addis r2, r12, (.TOC.-callee_ctr_indirec_entry)@ha
    addi r2.r2, (.TOC.-callee_ctr_indirect_entry)@l
calle_direct_local_entry:
    ...                      ! subroutine body
    blr                      ! return to caller
```

Advantageously, the MFCTR instruction loading the value of the count register can provide the predicted speculative value of CTR immediately, enabling the subsequent sequence of addis and addi to compute the GOT pointer as a register to access global variables, and enabling global variable accesses to proceed that would otherwise delay the processing of the subroutine body.

In another embodiment, e.g., in accordance with the System/360 instruction set, subroutine calls may be performed using a register indirect call, and only a single entry point may be present.

Figure 27A:
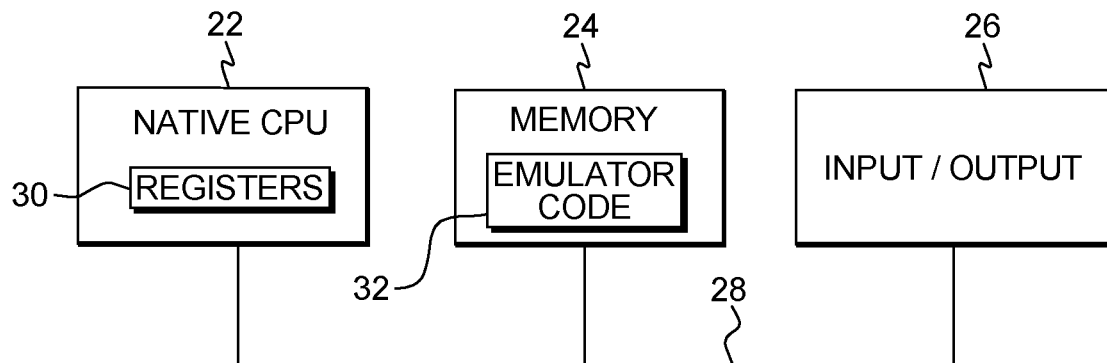
FIG. 27A depicts another example of a computing environment to incorporate and use one or more aspects of the present invention.

Other types of computing environments may also incorporate and use one or more aspects of the present invention, including, but not limited to, emulation environments, an example of which is described with reference to FIG. 27A. In this example, a computing environment 20 includes, for instance, a native central processing unit (CPU) 22, a memory 24, and one or more input/output devices and/or interfaces 26 coupled to one another via, for example, one or more buses 28 and/or other connections. As examples, computing environment 20 may include a PowerPC processor or a Power server offered by International Business Machines Corporation, Armonk, N.Y.; and/or other machines based on architectures offered by International Business Machines Corporation, Intel, or other companies.

Native central processing unit 22 includes one or more native registers 30, such as one or more general purpose registers and/or one or more special purpose registers used during processing within the environment. These registers include information that represents the state of the environment at any particular point in time.

Moreover, native central processing unit 22 executes instructions and code that are stored in memory 24. In one particular example, the central processing unit executes emulator code 32 stored in memory 24. This code enables the computing environment configured in one architecture to emulate another architecture. For instance, emulator code 32 allows machines based on architectures other than the z/Architecture, such as PowerPC processors, pSeries servers, or other servers or processors, to emulate the z/Architecture and to execute software and instructions developed based on the z/Architecture.

Figure 27B:
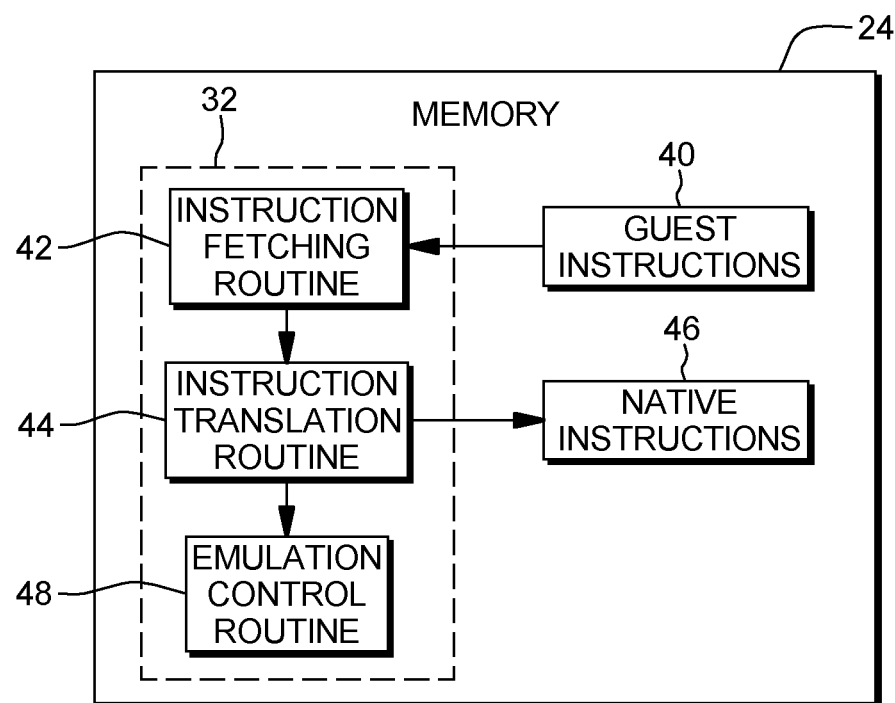
FIG. 27B depicts further details of the memory of FIG. 27A.

Further details relating to emulator code 32 are described with reference to FIG. 27B. Guest instructions 40 stored in memory 24 comprise software instructions (e.g., correlating to machine instructions) that were developed to be executed in an architecture other than that of native CPU 22. For example, guest instructions 40 may have been designed to execute on a z/Architecture processor, but instead, are being emulated on native CPU 22, which may be, for example, an Intel processor. In one example, emulator code 32 includes an instruction fetching routine 42 to obtain one or more guest instructions 40 from memory 24, and to optionally provide local buffering for the instructions obtained. It also includes an instruction translation routine 44 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 32 includes an emulation control routine 48 to cause the native instructions to be executed. Emulation control routine 48 may cause native CPU 22 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 46 may include loading data into a register from memory 24; storing data back to memory from a register; or performing some type of arithmetic or logic operation, as determined by the translation routine.

Each routine is, for instance, implemented in software, which is stored in memory and executed by native central processing unit 22. In other examples, one or more of the routines or operations are implemented in firmware, hardware, software or some combination thereof. The registers of the emulated processor may be emulated using registers 30 of the native CPU or by using locations in memory 24. In embodiments, guest instructions 40, native instructions 46 and emulator code 32 may reside in the same memory or may be disbursed among different memory devices.

As used herein, firmware includes, e.g., the microcode or Millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

A guest instruction 40 that is obtained, translated and executed may be, for instance, one of the instructions described herein. The instruction, which is of one architecture (e.g., the z/Architecture), is fetched from memory, translated and represented as a sequence of native instructions 46 of another architecture (e.g., PowerPC, pSeries, Intel, etc.). These native instructions are then executed.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 28:
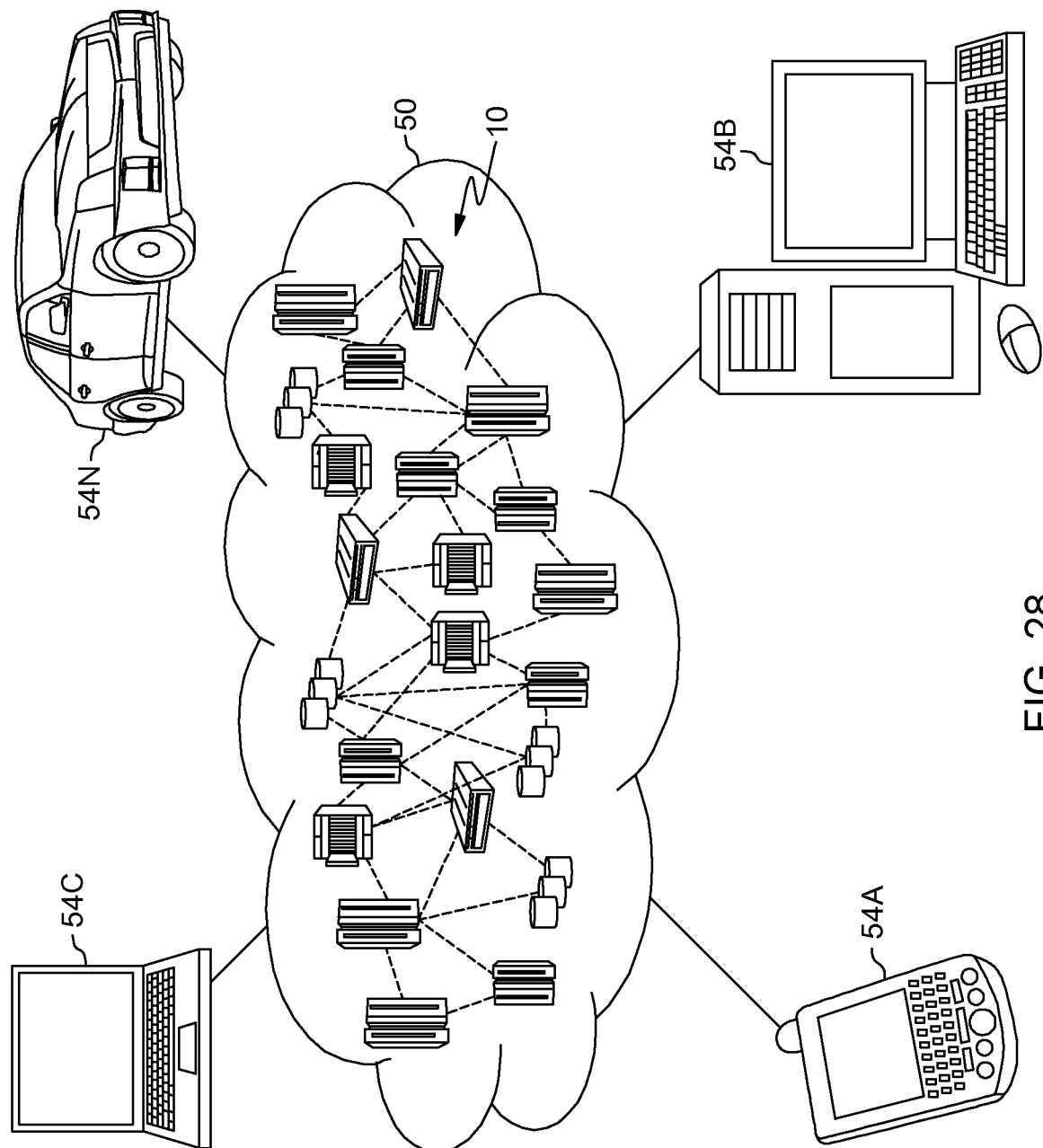
FIG. 28 depicts one embodiment of a cloud computing environment.

Referring now to FIG. 28, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 28 are intended to be illustrative only and that computing nodes 10 and cloud computing environment 50 can communicate with any type of computerized device over any type of network and/or network addressable connection (e.g., using a web browser).

Figure 29:
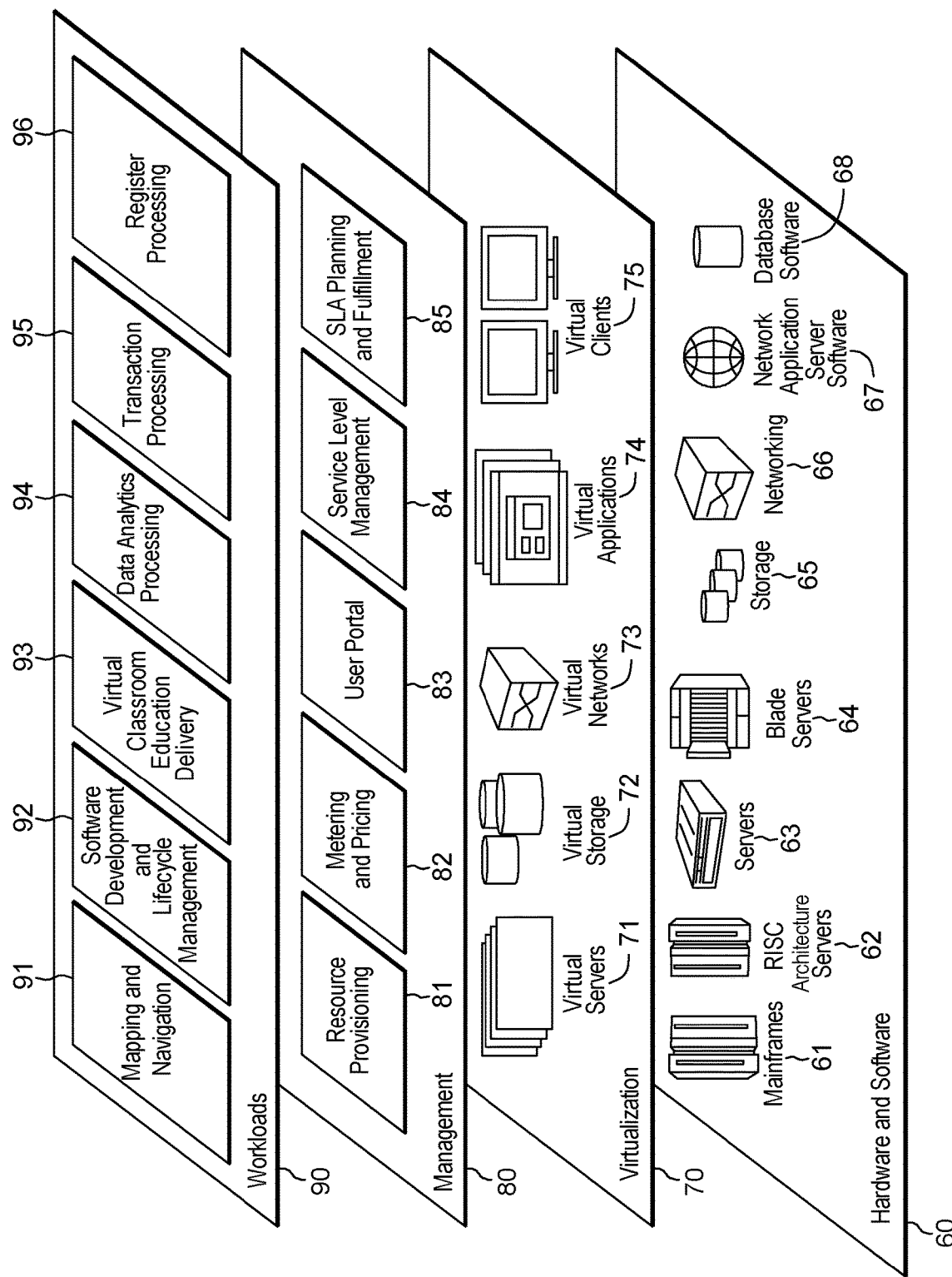
FIG. 29 depicts one example of abstraction model layers.

Referring now to FIG. 29, a set of functional abstraction layers provided by cloud computing environment 50 (FIG. 28) is shown. It should be understood in advance that the components, layers, and functions shown in FIG. 29 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and register processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions or operations may be used. Additionally, different registers may be used and/or other types of indications (other than register numbers) may be specified. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   a computer readable storage medium readable by a processing circuit and storing instructions for performing a method comprising:
      predicting a predicted value to be used in register-indirect branching, the predicted value to be stored in one or more locations based on the prediction, wherein the predicted value is a predicted target address to be used in a register-indirect branch;
      storing the predicted value in a first selected location and a second selected location, the storing being performed concurrently to processing the register-indirect branch;
      obtaining an offset for a predicted derived value, the predicted derived value to be used as a pointer to a reference data structure providing access to variables used in processing;
      generating the predicted derived value using the predicted value and the offset; and
      using the predicted derived value to access the reference data structure during processing.

2. The computer program product of claim 1, wherein the first selected location comprises a first register and the second selected location comprises a second register.

3. The computer program product of claim 1, wherein the method further comprises:
   determining whether prediction is to be performed for the predicted derived value; and
   obtaining the offset, based on determining the predicted derived value is to be predicted.

4. The computer program product of claim 1, wherein the method further comprises:
   allocating a register for the predicted derived value; and
   storing the predicted derived value in the register.

5. The computer program product of claim 4, wherein the method further comprises marking the register as available to be read.

6. The computer program product of claim 1, wherein the method further comprises initiating a check for correct prediction of the predicted derived value.

7. The computer program product of claim 6, wherein the method further comprises performing recovery based on a misprediction.

8. The computer program product of claim 1, wherein the method further comprises initiating a check for correct prediction of the predicted value.

* * * * *